United States Patent
Padilla-Acevedo et al.

(10) Patent No.: US 12,428,504 B2
(45) Date of Patent: Sep. 30, 2025

(54) BIPHENYLPHENOL POLYMERIZATION CATALYSTS

(71) Applicant: Dow Global Technologies LLC, Midland, MI (US)

(72) Inventors: Angela I. Padilla-Acevedo, Lake Jackson, TX (US); Andrew J. Young, Houston, TX (US); Roger L. Kuhlman, Lake Jackson, TX (US); Ruth Figueroa, Midland, MI (US); Susan Brown, Pearland, TX (US); Matthew E. Belowich, Midland, MI (US); David R. Neithamer, Midland, MI (US); Jerzy Klosin, Midland, MI (US); David M. Pearson, Lake Jackson, TX (US); Mari S. Rosen, Midland, MI (US); Bethany M. Neilson, Lake Jackson, TX (US); Johnathan E. DeLorbe, Lake Jackson, TX (US); Leslie E. O'Leary, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 761 days.

(21) Appl. No.: 17/771,854

(22) PCT Filed: Nov. 4, 2020

(86) PCT No.: PCT/US2020/058842
§ 371 (c)(1),
(2) Date: Apr. 26, 2022

(87) PCT Pub. No.: WO2021/091983
PCT Pub. Date: May 14, 2021

(65) Prior Publication Data
US 2022/0403061 A1    Dec. 22, 2022

Related U.S. Application Data

(60) Provisional application No. 62/930,471, filed on Nov. 4, 2019.

(51) Int. Cl.
*C08F 4/64* (2006.01)
*C08F 2/34* (2006.01)
*C08F 4/659* (2006.01)
*C08F 4/76* (2006.01)
*C08F 10/02* (2006.01)

(52) U.S. Cl.
CPC ............ *C08F 4/65916* (2013.01); *C08F 2/34* (2013.01); *C08F 4/64193* (2013.01); *C08F 10/02* (2013.01)

(58) Field of Classification Search
CPC ..... C08F 4/64193; C08F 4/65916; C08F 2/34
See application file for complete search history.

(56) References Cited

U.S. PATENT DOCUMENTS

| | | | |
|---|---|---|---|
| 7,241,714 B2 * | 7/2007 | Boussie | C08F 10/00 502/103 |
| 8,455,601 B2 | 6/2013 | Kolb et al. | |
| 8,586,497 B2 | 11/2013 | Kolb et al. | |
| 8,609,794 B2 | 12/2013 | Klosin et al. | |
| 8,835,577 B2 | 9/2014 | Rix et al. | |
| 9,234,060 B2 | 1/2016 | Kao et al. | |
| 9,527,940 B2 * | 12/2016 | Demirors | C08F 210/16 |
| 9,527,941 B2 * | 12/2016 | Demirors | C08F 210/16 |
| 9,751,998 B2 | 9/2017 | Klosin et al. | |
| 10,519,260 B2 * | 12/2019 | Fontaine | C08F 210/16 |
| 10,597,473 B2 | 3/2020 | Figueroa et al. | |
| 10,654,029 B2 | 5/2020 | Faler et al. | |
| 11,155,658 B2 | 10/2021 | Carnahan et al. | |
| 11,384,229 B2 * | 7/2022 | Demirors | C08L 23/0815 |
| 2006/0025548 A1 | 2/2006 | Boussie et al. | |
| 2008/0051537 A1 | 2/2008 | Carnahan et al. | |
| 2009/0306323 A1 | 12/2009 | Kolb et al. | |
| 2010/0120981 A1 | 5/2010 | Shin et al. | |
| 2010/0184931 A1 | 7/2010 | Diamond et al. | |
| 2015/0291713 A1 | 10/2015 | Klosin et al. | |
| 2016/0108156 A1 | 4/2016 | Klosin et al. | |
| 2017/0158790 A1 | 6/2017 | Klosin et al. | |
| 2018/0002464 A1 | 1/2018 | Fontaine et al. | |
| 2018/0194871 A1 | 7/2018 | Figueroa et al. | |
| 2018/0282452 A1 | 10/2018 | Fontaine et al. | |
| 2021/0246274 A1 * | 8/2021 | Hart | C08J 5/18 |
| 2021/0246288 A1 * | 8/2021 | Hart | C08F 210/14 |

FOREIGN PATENT DOCUMENTS

WO    2011146044 A1    11/2011

OTHER PUBLICATIONS

International Preliminary Report on Patentability for related PCT Application PCT/US2020/058842, mailed May 19, 2022 (9 pgs).
International Search Report & Written Opinion for related PCT Application PCT/US2020/058842, mailed Jan. 27, 2021 (14 pgs).

\* cited by examiner

*Primary Examiner* — Rip A Lee

(57) ABSTRACT

Embodiments are directed towards the use of a supported biphenylphenol polymerization catalyst made from a biphenylphenol polymerization precatalyst of Formula I via a gas-phase or slurry-phase polymerization process under gas-phase or slurry-phase polymerization conditions to make a polymer.

4 Claims, No Drawings

BIPHENYLPHENOL POLYMERIZATION CATALYSTS

This application is a National Stage Application under 35 U.S.C. § 371 of International Application Number PCT/US2020/058842, filed Nov. 4, 2020 and published as WO 2021/091983 on May 14, 2021, which claims the benefit to U.S. Provisional Application 62/930,471, filed Nov. 4, 2019, the entire contents of which are incorporated herein by reference in its entirety

FIELD OF DISCLOSURE

Embodiments of the present disclosure are directed towards biphenylphenol polymerization catalysts, more specifically, supported biphenylphenol polymerization catalysts that may be utilized to make a polymer via a polymerization process in a single gas-phase or slurry-phase polymerization reactor.

BACKGROUND

Polymers may be utilized for a number of products including as films, fibers, nonwoven and/or woven fabrics, extruded articles, and/or molded articles, among others. Polymers can be made by reacting one or more types of monomer in a polymerization reaction in the presence of a polymerization catalyst.

SUMMARY

The present disclosure provides various embodiments, including:

A use of a supported biphenylphenol polymerization catalyst to make a polymer via a gas-phase polymerization process or slurry-phase polymerization process, wherein the supported biphenylphenol polymerization catalyst is made from a biphenylphenol polymerization precatalyst of Formula I:

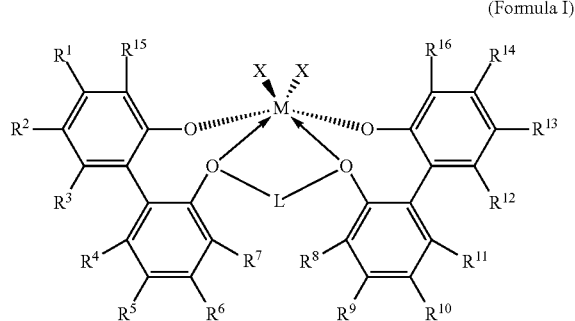

(Formula I)

wherein each of $R^7$ and $R^8$ independently is a $C_1$ alkyl, halogen, or a hydrogen;
wherein each of $R^5$ and $R^{10}$ independently is a $C_1$ to $C_{20}$ alkyl, aryl, aralkyl, halogen, or a hydrogen;
wherein each of $R^4$ and $R^{11}$ independently is a halogen or a hydrogen;
wherein each of $R^2$ and $R^{13}$ independently is a $C_1$ to $C_{20}$ alkyl, aryl or aralkyl or a hydrogen;
wherein each of $R^{15}$ and $R^{16}$ independently is a 2,7-disubstituted carbazol-9-yl or a 3,6-disubstituted carbazol-9-yl;
wherein L is a $C_3$ or $C_4$ alkylene that forms a 3-carbon bridge or 4-carbon bridge, respectively, between the two oxygen atoms to which L is covalently bonded;
wherein each of $R^1$, $R^3$, $R^{12}$, and $R^{14}$ is a hydrogen;
wherein each of $R^6$ and $R^9$ is a hydrogen or $C_1$-$C_8$ alkyl; optionally, $R^6$ can be linked with $R^7$ and $R^8$ can be linked to $R^9$ to form a cyclic structure;
wherein each X independently is a halogen, a hydrogen, a $(C_1$-$C_{20})$alkyl, a $(C_7$-$C_{20})$aralkyl, a $(C_1$-$C_6)$alkyl-substituted $(C_6$-$C_{12})$aryl, or a $(C_1$-$C_6)$alkyl-substituted benzyl, —$CH_2Si(R^C)_3$, where $R^C$ is $C_1$-$C_{12}$ hydrocarbon; and
wherein M is Zr or Hf.

A method of making a supported biphenylphenol polymerization catalyst, the method comprising: disposing the biphenylphenol polymerization precatalyst of Formula I on a support to give a supported biphenylphenol polymerization precatalyst; and contacting, under activating conditions, the supported biphenylphenol polymerization precatalyst of Formula I with an activator so as to activate the supported biphenylphenol polymerization precatalyst of Formula I, thereby making the supported biphenylphenol polymerization catalyst.

A method of making a polyethylene composition, the method comprising: polymerizing ethylene in a single gas-phase polymerization reactor under gas-phase polymerization conditions, respectively, in presence of the supported biphenylphenol polymerization catalyst to make the polyethylene composition without help from any other polymerization catalyst;

A method of making a polyethylene composition, the method comprising polymerizing ethylene in a single slurry-phase polymerization reactor under slurry-phase polymerization conditions in presence of the supported biphenylphenol polymerization catalyst to make the polyethylene composition without help from any other polymerization catalyst; and A biphenylphenol polymerization precatalyst selected from a group consisting of structures (i), (ii), (iii), (viii), and (v), as detailed herein.

DETAILED DESCRIPTION

The biphenylphenol polymerization precatalyst herein can be represented by the Formula I:

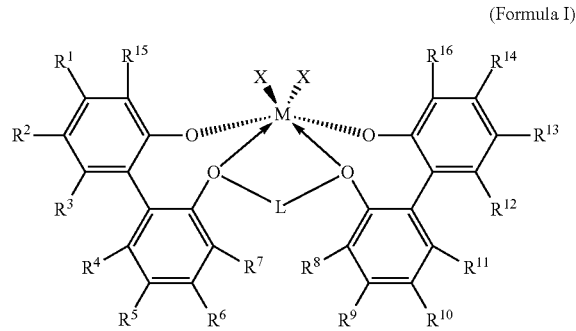

(Formula I)

wherein each of $R^7$ and $R^8$ independently is a $C_1$ alkyl, halogen, or a hydrogen;
wherein each of $R^5$ and $R^{10}$ independently is a $C_1$ to $C_{20}$ alkyl, aryl, aralkyl, halogen, or a hydrogen;
wherein each of $R^4$ and $R^{11}$ independently is a halogen or a hydrogen;

wherein each of $R^2$ and $R^{13}$ independently is a $C_1$ to $C_{20}$ alkyl, aryl or aralkyl or a hydrogen;

wherein each of $R^{15}$ and $R^{16}$ independently is a 2,7-disubstituted carbazol-9-yl or a 3,6-disubstituted carbazol-9-yl;

wherein L is a $C_3$ or $C_4$ alkylene that forms a 3-carbon bridge or 4-carbon bridge, respectively, between the two oxygen atoms to which L is covalently bonded;

wherein each of $R^1$, $R^3$, $R^{12}$, and $R^{14}$ is a hydrogen;

wherein each of $R^6$ and $R^9$ is a hydrogen or $C_1$-$C_8$ alkyl; optionally, $R^6$ can be linked with $R^7$ and $R^8$ can be linked to $R^9$ to form a cyclic structure;

wherein each X independently is a halogen, a hydrogen, a ($C_1$-$C_{20}$)alkyl, a ($C_7$-$C_{20}$)aralkyl, a ($C_1$-$C_6$)alkyl-substituted ($C_6$-$C_{12}$)aryl, or a ($C_1$-$C_6$)alkyl-substituted benzyl, —CH$_2$Si(R$^C$)$_3$, where R$^C$ is $C_1$-$C_{12}$ hydrocarbon; and wherein M is Zr or Hf.

In various embodiments the polymerization catalyst of Formula I can be used to produce a polymer composition without help from any other polymerization catalyst. As used herein, the "without help from any other polymerization catalyst" refers to a presence of less than 1 percent by weight of another polymerization catalyst or the presence of zero percent by weight of another polymerization catalyst based on a total weight of components in a catalyst system employed to make the polymers such a bimodal polymer as detailed herein. As used herein the terms the "other" or "another" polymerization catalyst refers to any catalyst that would typically be employed to produce a polymer and that is not the polymerization catalyst of Formula I. As used herein, a "polymerization catalyst" may include any compound that, when activated, is capable of catalyzing the polymerization or oligomerization of olefins, wherein the catalyst compound comprises at least one Group 3 to 12 atom, and optionally at least one leaving group bound thereto. Examples of such "other"/"another" polymerization catalysts include a Ziegler-Natta catalyst, a chromium-based catalyst (e.g., a so-called Phillips catalyst), a metallocene catalyst that includes or is free of an indenyl ring (e.g., a metallocene catalyst that contains unsubstituted and/or alkyl-substituted cyclopentadienyl rings), a Group 15 metal-containing catalyst compound described in paragraphs [0041] to [0046] of WO 2018/064038 A1, or a biphenylphenolic catalyst compound described in paragraphs [0036] to [0080] of US20180002464A1, other than the biphenylphenol polymerization precatalyst of Formula I or an activation product of the biphenylphenol polymerization precatalyst of Formula I.

The biphenylphenol polymerization precatalysts of Formula I (i.e., the biphenylphenol polymerization precatalyst) may be utilized to make the biphenylphenol polymerization catalysts. For instance, the biphenylphenol polymerization precatalyst may be contacted, under activating conditions, with an activator so as to activate the biphenylphenol polymerization precatalyst, thereby making the polymerization catalyst. Embodiments provide a method of making a supported biphenylphenol polymerization catalyst, as detailed herein. The supported biphenylphenol polymerization catalysts herein made from only the biphenylphenol polymerization precatalyst are useful for making a polyolefin polymer characterized by a polymodal distribution such as a bimodal molecular weight distribution.

As mentioned, each of $R^7$ and $R^8$ as shown in Formula I, can independently be a $C_1$ alkyl, halogen, or a hydrogen. One or more embodiments provide that $R^7$ is fluorine and $R^8$ is a $C_1$ alkyl, e.g. methyl. One or more embodiments provide that each of $R^7$ is and $R^8$ is a $C_1$ alkyl, e.g. methyl. One or more embodiments provide that each of $R^7$ is and $R^8$ is a hydrogen. One or more embodiments provide that each of $R^7$ is and $R^8$ is a halogen such as fluorine.

As used herein, an "alkyl" includes linear, branched and cyclic paraffin radicals that are deficient by one hydrogen. Alkyls include branched or unbranched saturated hydrocarbon group typically although not necessarily containing 1 to about 50 carbon atoms, such as methyl, ethyl, n-propyl, isopropyl, n-butyl, iso-butyl, t-butyl, octyl, decyl, and the like, as well as cycloalkyls such as cyclopentyl, cyclohexyl and the like. Generally, although again not necessarily, alkyls herein may contain 1 to about 12 carbon atoms. Thus, for example, a CH$_3$ group ("methyl") and a CH$_3$CH$_2$ group ("ethyl") are examples of alkyls.

As mentioned, each of $R^5$ and $R^{10}$ as shown in Formula I, can independently be an alkyl, aryl, aralkyl, halogen, or a hydrogen. For instance, one or more embodiments provide that $R^5$ and $R^{10}$ is a halogen such as fluorine. One or more embodiments provide that each of $R^5$ and $R^{10}$ is a hydrogen. One or more embodiments provide that each of $R^5$ and $R^{10}$ is a hydrogen or that each of $R^5$ and $R^{10}$ is a fluorine.

As used herein, "aryl" include phenyl, naphthyl, pyridyl and other radicals whose molecules have the ring structure characteristic of benzene, naphthylene, phenanthrene, anthracene, etc. It is understood that an "aryl" can be a $C_6$ to $C_{20}$ aryl. For example, a $C_6H_5$-aromatic structure is a "phenyl", a —$C_6H_4$-aromatic structure is a "phenylene". As used herein, an "aralkyl", which can also be called an "arylalkyl", is an alkyl having an aryl pendant therefrom. It is understood that an "aralkyl" can be a $C_7$ to $C_{20}$ aralkyl. An "alkylaryl" is an aryl having one or more alkyls pendant therefrom. As used herein, a "hydrocarbyl" includes aliphatic, cyclic, olefinic, acetylenic and aromatic radicals (i.e., hydrocarbon radicals) comprising hydrogen and carbon that are deficient by one hydrogen.

As mentioned, each of $R^4$ and $R^{11}$ as shown in Formula I, can independently be a hydrogen or a halogen atom such as fluorine. For instance, one or more embodiments provide that each of $R^5$ and $R^{10}$ is a hydrogen. One or more embodiments provide that each of $R^4$ and $R^{11}$ is a fluorine. One or more embodiments provide that each of $R^4$ and $R^{11}$ is a hydrogen or that each of $R^4$ and $R^{11}$ is a fluorine.

As mentioned, each of $R^2$ and $R^{13}$ as shown in Formula I, can independently be a $C_1$ to $C_{20}$ alkyl, aryl or aralkyl or a hydrogen. For instance, one or more embodiments provide that each of $R^2$ and $R^{13}$ is a $C_1$ alkyl. One or more embodiments provide that each of $R^2$ and $R^{13}$ is a $C_4$ alkyl such as n-butyl, t-butyl, or 2-methyl-pentyl. As mentioned, in various embodiments each of $R^1$, $R^3$, $R^{12}$, and $R^{14}$ are a hydrogen.

As mentioned, each of $R^{15}$ and $R^{16}$ as shown in Formula I, can independently be a 2,7-disubstituted carbazol-9-yl or a 3,6-disubstituted carbazol-9-yl. For instance, one or more embodiments provide that each of $R^{15}$ and $R^{16}$ is a 2,7-disubstituted carbazol-9-yl selected from a group consisting of a 2,7-di-t-butylcarbazol-9-yl, a 2,7-di-ethylcarbazol-9-yl, a 2,7-di-methylcarbazol-9-yl, and a 2,7-di-n-octyl-di-isopropyl-silylcarbazol-9-yl. For instance, the 2,7-disubstituted carbazol-9-yl can be selected from a group consisting of the biphenylphenol polymerization precatalysts of structures (i), (ii), (iii), and (viii), as detailed herein. In some embodiments, each of $R^{15}$ and $R^{16}$ is a 2,7-disubstituted carbazol-9-yl selected from a group consisting of a 2,7-di-t-butylcarbazol-9-yl, a 2,7-di-ethylcarbazol-9-yl, and a 2,7-di-methylcarbazol-9-yl. One or more embodiments provide that each of $R^{15}$ and $R^{16}$ is a 3,6-disubstituted carbazol-9-yl such as a 3,6-di-t-butylcarbazol-9-yl.

As mentioned, L, as shown in Formula I, can be a $C_3$ or $C_4$ alkylene that forms a 3-carbon bridge or 4-carbon bridge, respectively, between the two oxygen atoms to which L is covalently bonded. For instance, one or more embodiments provide that L is a $C_3$ alkylene. One or more embodiments provide that L is a $C_4$ alkylene.

As mentioned, each X, as shown in Formula I, X independently is a halogen, a hydrogen, a $(C_1$-$C_{20})$alkyl, a $(C_7$-$C_{20})$aralkyl, a $(C_1$-$C_6)$alkyl-substituted $(C_6$-$C_{12})$aryl, or a $(C_1$-$C_6)$alkyl-substituted benzyl, —$CH_2Si(R^C)_3$, where $R^C$ is $C_1$-$C_{12}$ hydrocarbon. For instance, one or more embodiments provide that each X is a $C_1$ alkyl. One or more embodiments provide that each X is a hydrogen.

As mentioned, M, as shown in Formula I, can be zirconium (Zr) or hafnium (Hf). In various embodiments, M can be selected from a group consisting of zirconium and hafnium. One or more embodiments provide that M is zirconium. One or more embodiments provide that M is hafnium.

One or more embodiments provide that $R^7$ and $R^8$ are a $C_1$ alkyl, fluorine, or hydrogen and that at least two of $R^5$, $R^6$, $R^9$ and $R^{10}$ are fluorine. One or more embodiments provide that $R^7$ and $R^8$ are a $C_1$ alkyl, fluorine, or hydrogen and that two of $R^5$, $R^6$, $R^9$ and $R^{10}$ are fluorine. One or more embodiments provide that $R^7$ and $R^8$ are a $C_1$ alkyl, fluorine, or hydrogen and that each of $R^5$, $R^6$, $R^9$ and $R^{10}$ is a fluorine.

Each of the R groups ($R^1$-$R^{16}$) and the X's of Formula I, as described herein, can independently be substituted or unsubstituted. For instance, in some embodiments, each of the X's of Formula I can independently be halogen, a hydrogen, a $(C_1$-$C_{20})$alkyl, a $(C_7$-$C_{20})$aralkyl, a $(C_1$-$C_6)$alkyl-substituted $(C_6$-$C_{12})$aryl, or a $(C_1$-$C_6)$alkyl-substituted benzyl, —$CH_2Si(R^C)_3$, where $R^C$ is $C_1$-$C_{12}$ hydrocarbon. As used herein, "substituted" indicates that the group following that term possesses at least one moiety in place of one or more hydrogens in any position, the moieties selected from such groups as halogen radicals, hydroxyl groups, carbonyl groups, carboxyl groups, amine groups, phosphine groups, alkoxy groups, phenyl groups, naphthyl groups, $C_1$ to $C_{20}$ alkyls, $C_2$ to $C_{10}$ alkenyl groups, and combinations thereof. Being "disubstituted" refers to the presence of two or more substituent groups in any position, the moieties selected from such groups as halogen radicals, hydroxyl groups, carbonyl groups, carboxyl groups, amine groups, phosphine groups, alkoxy groups, phenyl groups, naphthyl groups, $C_1$ to $C_{20}$ alkyls, $C_2$ to $C_{10}$ alkenyl groups, and combinations thereof.

The biphenylphenol polymerization precatalysts can be made utilizing reactants mentioned herein.

One or more embodiments provide a biphenylphenol polymerization catalyst, namely a supported biphenylphenol polymerization catalyst. The supported biphenylphenol polymerization catalyst can be made by contacting, under activating conditions, the biphenylphenol polymerization precatalysts and an activator to provide the activated biphenylphenol polymerization catalyst, e.g. an activated biphenylphenol polymerization precatalysts. Activating conditions are well known in the art.

As used herein, "activator" refers to any compound or combination of compounds, supported, or unsupported, which can activate a complex or a catalyst component, such as by creating a cationic species of the catalyst component. For example, this can include the abstraction of at least one leaving group, e.g., the "X" group described herein, from the metal center of the complex/catalyst component, e.g. the metal complex of Formula I. As used herein, "leaving group" refers to one or more chemical moieties bound to a metal atom and that can be abstracted by an activator, thus producing a species active towards olefin polymerization.

The activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as Dimethylanilinium tetrakis(pentafluorophenyl)borate, Triphenylcarbenium tetrakis(pentafluorophenyl)borate, Dimethylanilinium tetrakis(3,5-$(CF_3)_2$phenyl)borate, Triphenylcarbenium tetrakis(3,5-$(CF_3)_2$phenyl)borate, Dimethylanilinium tetrakis(perfluoronapthyl)borate, Triphenylcarbenium tetrakis(perfluoronapthyl)borate, Dimethylanilinium tetrakis(pentafluorophenyl)aluminate, Triphenylcarbenium tetrakis(pentafluorophenyl)aluminate, Dimethylanilinium tetrakis(perfluoronapthyl)aluminate, Triphenylcarbenium tetrakis(perfluoronapthyl)aluminate, a tris(perfluorophenyl) boron, a tris(perfluoronaphthyl)boron, tris(perfluorophenyl) aluminum, a tris(perfluoronaphthyl)aluminum or any combinations thereof.

Aluminoxanes can be described as oligomeric aluminum compounds having -Al(R)—O— subunits, where R is an alkyl. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. There are a variety of known methods for preparing aluminoxane and modified aluminoxanes. The aluminoxane can include a modified methyl aluminoxane ("MMAO") type 3A (commercially available from Akzo Chemicals, Inc. under the trade name Modified Methylaluminoxane type 3A, discussed in U.S. Pat. No. 5,041, 584). A source of MAO can be a solution having from about 1 wt. % to about a 50 wt. % MAO, for example. Commercially available MAO solutions can include the 10 wt. % and 30 wt. % MAO solutions available from Albemarle Corporation, of Baton Rouge, La.

One or more organo-aluminum compounds, such as one or more alkylaluminum compound, can be used in conjunction with the aluminoxanes. Examples of alkylaluminum compounds include, but are not limited to, diethylaluminum ethoxide, diethylaluminum chloride, diisobutylaluminum hydride, and combinations thereof. Examples of other alkylaluminum compounds, e.g., trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and combinations thereof.

The supported biphenylphenol polymerization catalyst, which is made from the biphenylphenol polymerization precatalyst, can be utilized to make a polymer. For instance, the supported biphenylphenol polymerization catalyst and an olefin can be contacted under polymerization conditions to make a polymer, e.g., a polyolefin polymer.

As used herein a "polymer" has two or more of the same or different polymer units derived from one or more different monomers, e.g., homopolymers, copolymers, terpolymers, etc. A "homopolymer" is a polymer having polymer units that are the same. A "copolymer" is a polymer having two or more polymer units that are different from each other. A "terpolymer" is a polymer having three polymer units that are different from each other. "Different" in reference to polymer units indicates that the polymer units differ from each other by at least one atom or are different isomerically. Accordingly, the definition of copolymer, as used herein, includes terpolymers and the like. As used herein a "polymerization process" is a process that is utilized to make a polymer. For instance, the polymerization process can be a gas-phase or slurry-phase polymerization process. In some embodiments, the polymerization process consists of a gas-phase polymerization process. In some embodiments the polymerization process consists of a slurry-phase polymerization process.

Embodiments provide that the polymer can be a polyolefin polymer. As used herein an "olefin," which may be referred to as an "alkene," refers to a linear, branched, or cyclic compound including carbon and hydrogen and having at least one double bond. As used herein, when a polymer or copolymer is referred to as comprising, e.g., being made from, an olefin, the olefin present in such polymer or copolymer is the polymerized form of the olefin. For example, when a copolymer is said to have an ethylene content of 75 wt % to 85 wt %, it is understood that the polymer unit in the copolymer is derived from ethylene in the polymerization reaction and the derived units are present at 75 wt % to 85 wt %, based upon the total weight of the polymer. A higher α-olefin refers to an α-olefin having 3 or more carbon atoms.

Polyolefins include polymers made from olefin monomers such as ethylene, i.e., polyethylene, and linear or branched higher alpha-olefin monomers containing 3 to 20 carbon atoms. Examples of higher alpha-olefin monomers include, but are not limited to, propylene, 1-butene, 1-pentene, 1-hexene, 4-methyl-1-pentene, 1-octene, and 3,5,5-trimethyl-1-hexene. Examples of polyolefins include ethylene-based polymers, having at least 50 wt % ethylene, including ethylene-1-butene, ethylene-1-hexene, and ethylene-1-octene copolymers, among others. Other olefins that may be utilized include ethylenically unsaturated monomers, diolefins having 4 to 18 carbon atoms, conjugated or nonconjugated dienes, polyenes, vinyl monomers and cyclic olefins, for example. Examples of the monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In a number of embodiments, a copolymer of ethylene can be produced, where with ethylene, a comonomer having at least one alpha-olefin having from 4 to 15 carbon atoms, preferably from 4 to 12 carbon atoms, and most preferably from 4 to 8 carbon atoms, is polymerized, e.g., in a gas-phase/slurry phase polymerization process. In another embodiment, ethylene and/or propylene can be polymerized with at least two different comonomers, optionally one of which may be a diene, to make a terpolymer. "Optional" or "optionally" means that the subsequently described event or circumstance may or may not occur, and that the description includes instances where said event or circumstance occurs and instances where it does not.

One or more embodiments provide that the polymer can include from 50 to 95 wt % of units derived from ethylene based on a total weight of the polymer. All individual values and subranges from 50 to 95 wt % are included; for example, the polymer can include from a lower limit of 50, 60, or 70 wt % of units derived from ethylene to an upper limit of 95, 90, or 85 wt % of units derived from ethylene based on the total weight of the polymer. The polymer can include from 5 to 50 wt % of units derived from comonomer based on the total weight of the polymer.

As mentioned, surprisingly, the supported biphenylphenol polymerization catalysts made from the biphenylphenol polymerization precatalyst can help to provide polymers via a polymerization process in a single gas-phase or slurry-phase (not solution-phase) polymerization reactor without help from any other polymerization catalyst. For instance, the resultant polymers can have an improved, i.e., higher, polydispersity index (PDI) as detailed herein, as compared to polymers made with other (non-inventive) polymerization catalysts at similar polymerization conditions. An increased PDI is desirable in some applications. Similarly, the resultant polymers can have at least a high molecular weight polyethylene component and a low molecular weight polyethylene component, as detailed herein. Having a high molecular weight polyethylene component and a low molecular weight polyethylene component is desirable in some applications.

Embodiments provide that the polymer can have a Mn (number average molecular weight) from 3,000 to 105,000. All individual values and subranges from 3,000 to 105,000 are included; for example, the polymer can have a Mn from a lower limit of 3,000; 4,000; 5,000; 6,000; 7,000; 7,500; 8,000; or 8,500 to an upper limit of 105,000; 103,000; 75,000; 65,000; 55,000; 45,000; 35,000; 25,000; 24,000; 23,000; or 22,000. Mn can be determined by gel permeation chromatography (GPC), as is known in the art and is described below. For instance, in some embodiments, the polymer made via as-phase can have a Mn from 5,000 to 80,000. In some embodiments, the polymer produced utilizing a gas-phase polymerization reactor can have a Mn from 4,000 to 103,000.

Embodiments provide that the polymer can have a Mw (weight average molecular weight) from 25,000 to 1,600,000. All individual values and subranges from 25,000 to 1,600,000 are included; for example, the polymer can have a Mw from a lower limit of 25,000; 60,000; 80,000; or 100,000, 120,000, 145,000, 160,000, or 200,000 to an upper limit of 1,600,000; 1,500,000; 1,110,000; 500,000; 400,000; or 300,000. Mw can be determined by GPC, described below. For instance, in some embodiments, the polymer produced utilizing a gas-phase polymerization reactor can have a Mw from 160,000 to 1,500,000. In some embodiments, the polymer made utilizing a gas-phase polymerization reactor can have a Mw from 25,000 to 400,000.

Embodiments provide that the polymer can have polydispersity index (PDI) (determined as Mw/Mn) from 3.00 to 40.00. All individual values and subranges from 3.00 to 40.00 are included; for example, the polymer can have a Mw/Mn from a lower limit of 3.00; 3.50; 4.00; 4.50, 5.00 to an upper limit of 40.00; 36.00; 18.00; 15.00; 8.00; 7.50; 7.00; or 6.50. Mw/Mn can be determined by GPC analysis, as described below. In one or more embodiments that polymer can have a PDI in a range of from 3 to 40; from 5 to 40, or from 7 to 40. For instance, in some embodiments, the polymer made utilizing a gas-phase polymerization reactor can have a PDI from 5.56 to 36.36. In some embodiments, the polymer made utilizing a gas-phase polymerization reactor can have a PDI from 3.6 to 7.5. In some embodiments, the polymer can have a PDI of at least 5.00. For instance, in some embodiments the PDI can be in a range from 5.00 to 36.00 or 5.00 to 40.00.

Embodiments provide that the polymer made utilizing a gas-phase polymerization reactor can have melt temperature (Tm) from 118 to 132 degrees Celsius (° C.). All individual values and subranges from 118 to 132° C. are included; for example, the polymer can have a Tm from a lower limit of 118, 119, or 120 to an upper limit of 132, 130, or 128° C.

The polymer made using a slurry-phase polymerization reactor can have the same or similar Mn, Mw, PDI, and/or Tm as the polymer made using the gas-phase polymerization reactor.

Gel permeation chromatography (GPC) Test Method: Weight-Average Molecular Weight Test Method: determine $M_w$, number-average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, $a_{PS}$=0.67, $K_{PS}$=0.00017; and $a_x$ and $K_x$ are obtained from published literature. For polyethylenes, $a_x/K_x$=0.695/0.000579. For polypropylenes $a_x/K_x$=0.705/0.0002288. At each point in the resulting chromatogram, calculate concentration, c, from a baseline-subtracted DRI signal, $I_{DRI}$, using the following equation: $c=K_{DRI}I_{DRI}/(dn/dc)$, wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW) on the y-axis versus Log(MW) on the x-axis to give a GPC chromatogram, wherein Log(MW) and dW/d Log(MW) are as defined above.

The polymer can be utilized for a number of articles such as films, fibers, nonwoven and/or woven fabrics, extruded articles, and/or molded articles, among others.

The biphenylphenol polymerization precatalyst and/or the biphenylphenol polymerization catalyst, as detailed herein, as well as other components discussed herein such as the activator, may be utilized with a support. A "support", which may also be referred to as a "carrier", refers to any support material, including a porous support material, such as talc, inorganic oxides, and inorganic chlorides.

The biphenylphenol polymerization precatalyst and/or the biphenylphenol polymerization catalyst, as well as other components discussed herein, can be supported on the same or separate supports, or one or more of the components may be used in an unsupported form. Utilizing the support may be accomplished by any technique used in the art. One or more embodiments provide that a spray dry process is utilized. Spray dry processes are well known in the art. The support may be functionalized.

The support may be a porous support material, for example, talc, an inorganic oxide, or an inorganic chloride. Other support materials include resinous support materials, e.g., polystyrene, functionalized or crosslinked organic supports, such as polystyrene divinyl benzene polyolefins or polymeric compounds, zeolites, clays, or any other organic or inorganic support material and the like, or mixtures thereof.

Support materials include inorganic oxides that include Group 2, 3, 4, 5, 13 or 14 metal oxides. Some preferred supports include silica, fumed silica, alumina, silica-alumina, and mixtures thereof. Some other supports include magnesia, titania, zirconia, magnesium chloride, montmorillonite, phyllosilicate, zeolites, talc, clays) and the like. Also, combinations of these support materials may be used, for example, silica-chromium, silica-alumina, silica-titania and the like. Additional support materials may include porous acrylic polymers, nanocomposites, aerogels, spherulites, and polymeric beads.

An example of a support is fumed silica available under the trade name Cabosil™ TS-610, or other TS- or TG-series supports, available from Cabot Corporation. Fumed silica is typically a silica with particles 7 to 30 nanometers in size that has been treated with dimethylsilyldichloride such that a majority of the surface hydroxyl groups are capped.

The support material may have a surface area in the range of from about 10 to about 700 m/g, pore volume in the range of from about 0.1 to about 4.0 g/cm³ and average particle size in the range of from about 5 to about 500 μm. More preferably, the surface area of the support material is in the range of from about 50 to about 500 m/g, pore volume of from about 0.5 to about 3.5 g/cm³ and average particle size of from about 10 to about 200 μm. Most preferably the surface area of the support material is in the range is from about 100 to about 400 m/g, pore volume from about 0.8 to about 3.0 g/cm³ and average particle size is from about 5 to about 100 μm. The average pore size of the carrier typically has pore size in the range of from 10 to 1000 A, preferably 50 to about 500 A, and most preferably 75 to about 350 A.

The biphenylphenol polymerization precatalyst and/or biphenylphenol polymerization precatalyst, as well as other components discussed herein such as the activator, may be slurried. Slurries are well known in the art. The slurry may include the biphenylphenol polymerization precatalyst, an activator, and a support, for instance.

A molar ratio of metal in the activator to metal in the biphenylphenol polymerization precatalyst in the slurry may be 1000:1 to 0.5:1, 300:1 to 1:1, or 150:1 to 1:1. One or more diluents, e.g., fluids, can be used to facilitate the combination of any two or more components in the slurry. For example, the biphenylphenol polymerization precatalyst and the activator can be combined together in the presence of toluene or another non-reactive hydrocarbon or hydrocarbon mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the mixture or the metal-ligand complex/activator can be added to the support. The slurry may be fed to the reactor for the polymerization process, and/or the slurry may be dried, e.g., spay-dried, prior to being fed to the reactor for the polymerization process.

The polymerization process may be a slurry-phase polymerization process, and/or a gas-phase polymerization process. The polymerization process may utilize using known equipment and reaction conditions, e.g., known polymerization conditions. The polymerization process is not limited to any specific type of polymerization system. As an example, polymerization temperatures may range from about 0° C. to about 300° C. at atmospheric, sub-atmospheric, or super-atmospheric pressures. In particular, slurry or solution polymerization systems may employ sub-atmospheric, or alternatively, super-atmospheric pressures, and temperatures in the range of about 40° C. to about 300° C. Embodiments provide a method of making a polyolefin polymer the method comprising: contacting, under polymerization conditions, an olefin with the biphenylphenol polymerization catalyst, as described herein, to polymerize the olefin, thereby making a polyolefin polymer.

One or more embodiments provide that the polymers may be formed via a gas-phase polymerization system, at super-atmospheric pressures in the range from 0.07 to 68.9 bar, from 3.45 to 27.6 bar, or from 6.89 to 24.1 bar, and a temperature in the range from 30° C. to 130° C., from 65° C. to 110° C., from 75° C. to 120° C., or from 80° C. to 120° C. For one or more embodiments, operating temperatures may be less than 112° C. Stirred and/or fluidized bed gas-phase polymerization systems may be utilized.

Generally, a conventional gas-phase fluidized bed polymerization process can be conducted by passing a stream containing one or more olefin monomers continuously through a fluidized bed reactor under reaction conditions and in the presence of a catalytic composition, e.g., a composition including the biphenylphenol polymerization precatalyst and the activator, at a velocity sufficient to maintain a bed of solid particles in a suspended state. A stream comprising unreacted monomer can be continuously withdrawn from the reactor, compressed, cooled, optionally partially or fully condensed, and recycled back to the reactor. Product, i.e., polymer, can be withdrawn from the reactor and replacement monomer can be added to the recycle stream. Gases inert to the catalytic composition and reactants may also be present in the gas stream. The polymerization system may include a single reactor or two or more reactors in series, for example.

Feed streams for the polymerization process may include olefin monomer, non-olefinic gas such as nitrogen and/or hydrogen, and may further include one or more non-reactive alkanes that may be condensable in the polymerization process and used for removing the heat of reaction. Illustrative non-reactive alkanes include, but are not limited to, propane, butane, isobutane, pentane, isopentane, hexane, isomers thereof and derivatives thereof. Feeds may enter the reactor at a single or multiple and different locations.

For the polymerization process, the biphenylphenol polymerization catalyst such as a supported biphenylphenol polymerization catalyst may be continuously fed to the reactor. A gas that is inert to the biphenylphenol polymerization catalyst, such as nitrogen or argon, can be used to carry the biphenylphenol polymerization catalyst into the reactor bed. In one embodiment, the biphenylphenol polymerization catalyst can be provided as a slurry in mineral oil or liquid hydrocarbon or mixture such, as for example, propane, butane, isopentane, hexane, heptane or octane. The slurry may be delivered to the reactor with a carrier fluid, such as, for example, nitrogen or argon or a liquid such as for example isopentane or other $C_3$ to $C_8$ alkanes.

For the polymerization process, hydrogen may be utilized at a gas mole ratio of hydrogen to ethylene in the reactor that can be in a range of about 0.0 to 2.5, 0.0 to 2.0, 0.0 to 1.5, 0.0 to 1.0, in a range of 0.01 to 0.7, in a range of 0.03 to 0.5, in a range of 0.005 to 0.3, or in a range in a range of 0.0017 to 0.0068. A number of embodiments utilize hydrogen gas.

A number of aspects of the present disclosure are provided as follows.

Aspect 1 provides a use of a supported biphenylphenol polymerization catalyst to make a polymer via a gas-phase polymerization process or slurry-phase polymerization process, wherein the supported biphenylphenol polymerization catalyst is made from a biphenylphenol polymerization precatalyst of Formula I:

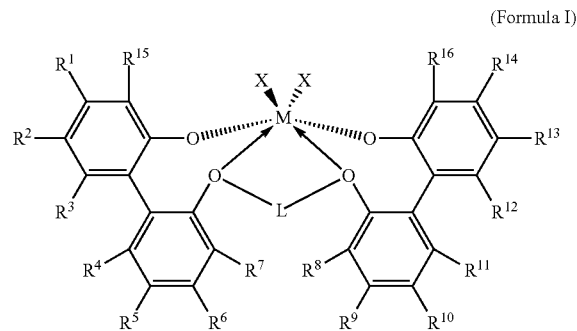

(Formula I)

wherein each of $R^7$ and $R^8$ independently is a $C_1$ alkyl, halogen, or a hydrogen;

wherein each of $R^5$ and $R^{10}$ independently is a $C_1$ to $C_{20}$ alkyl, aryl, aralkyl, halide, or a hydrogen;

wherein each of $R^4$ and $R^{11}$ independently is a halogen or a hydrogen;

wherein each of $R^2$ and $R^{13}$ independently is a $C_1$ to $C_{20}$ alkyl, aryl or aralkyl or a hydrogen;

wherein each of $R^{15}$ and $R^{16}$ independently is a 2,7-disubstituted carbazol-9-yl or a 3,6-disubstituted carbazol-9-yl;

wherein L is a $C_3$ or $C_4$ alkylene that forms a 3-carbon bridge or 4-carbon bridge, respectively, between the two oxygen atoms to which L is covalently bonded;

wherein each of $R^1$, $R^3$, $R^{12}$, and $R^{14}$ is a hydrogen;

wherein each of $R^6$ and $R^9$ is a hydrogen or $C_1$-$C_8$ alkyl; optionally, $R^6$ can be linked with $R^7$ and $R^8$ can be linked to $R^9$ to form a cyclic structure;

wherein each X independently is a halogen, a hydrogen, a $(C_1$-$C_{20})$alkyl, a $(C_7$-$C_{20})$aralkyl, a $(C_1$-$C_6)$alkyl-substituted ($C_6$-$C_{12}$)aryl, or a ($C_1$-$C_6$)alkyl-substituted benzyl, —$CH_2Si(R^C)_3$, where $R^C$ is $C_1$-$C_{12}$ hydrocarbon; and wherein M is Zr or Hf.

Aspect 2 the use of Aspect 1, wherein: $R^7$ and $R^8$ are a $C_1$ alkyl, fluorine, or hydrogen; and at least two of $R^5$, $R^6$, $R^9$ and $R^{10}$ are fluorine.

Aspect 3 the use of Aspect 1 wherein each of $R^{15}$ and $R^{16}$ is 2,7-disubstituted carbazol-9-yl selected from a group consisting of a 2,7-di-t-butylcarbazol-9-yl, a 2,7-di-ethyl-carbazol-9-yl, a 2,7-di-methylcarbazol-9-yl.

Aspect 4 provides the use of Aspect 3, wherein the biphenylphenol polymerization precatalyst of Formula I is selected from a group consisting of the structures (i), (ii), (iii), and (viii), as described herein.

Aspect 5 provides the use of Aspect 1 or 2, wherein each of $R^{15}$ and $R^{16}$ is a 3,6-di-t-butylcarbazol-9-yl.

Aspect 6 provides the use of Aspect 5, wherein the biphenylphenol polymerization precatalyst of Formula I is selected from a group consisting of the structures (iv) and (v), as detailed herein.

Aspect 7 provides use of Aspect 1, wherein each X is $C_1$ alkyl.

Aspect 8 provides a method of making a supported biphenylphenol polymerization catalyst, the method comprising: disposing the biphenylphenol polymerization precatalyst of Formula I on a support to give a supported biphenylphenol polymerization precatalyst; and contacting, under activating conditions, the supported biphenylphenol polymerization precatalyst of Formula I with an activator so as to activate the supported biphenylphenol polymerization precatalyst of Formula I, thereby making the supported biphenylphenol polymerization catalyst.

Aspect 9 provides a method of making a polyethylene composition, the method comprising polymerizing ethylene in a single gas-phase polymerization reactor under gas-phase polymerization conditions in presence of the supported biphenylphenol polymerization catalyst made by the method of Aspect 8 to make the polyethylene composition without help from any other polymerization catalyst; wherein the polyethylene composition comprises a high molecular weight polyethylene component and a low molecular weight polyethylene component.

Aspect 10 provides the method of Aspect 9 in which the polyethylene composition has a polydispersity index (PDI) in a range from 5 to 40 or 7 to 40.

Aspect 11 provides the method of Aspect 9 or 10 in which the polyethylene composition is bimodal.

Aspect 12 provides a method of making a polyethylene composition, the method comprising polymerizing ethylene in a single slurry-phase polymerization reactor under slurry-phase polymerization conditions in presence of the supported biphenylphenol polymerization catalyst made by the method of Aspect 8 to make the polyethylene composition without help from any other polymerization catalyst, wherein the polyethylene composition has a polydispersity index (PDI) in a range from 5 to 40 or 7 to 40.

Aspect 13 provides a biphenylphenol polymerization precatalyst selected from a group consisting of the structures (i), (ii), (iii), and (v), as detailed herein Aspect 14 provides a supported biphenylphenol polymerization catalyst made by the method of Aspect 8, wherein the biphenylphenol polymerization precatalyst of Formula I is selected from the biphenylphenol polymerization precatalyst of any of structures (i), (ii), (iii), (viii) or (v), as detailed herein.

Examples

A biphenylphenol polymerization precatalyst of Formula I:

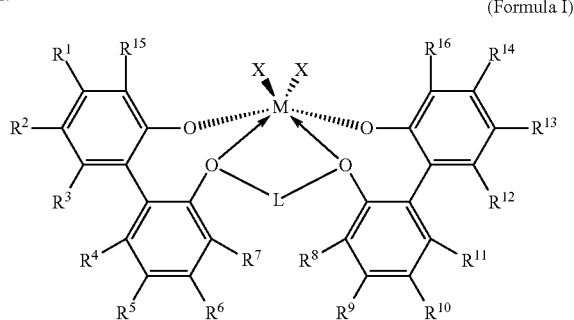

(Formula I)

wherein each of $R^7$ and Ra independently is a $C_1$ alkyl, halogen, or a hydrogen;
wherein each of $R^5$ and $R^{10}$ independently is a $C_1$ to $C_{20}$ alkyl, aryl, aralkyl, halogen, or a hydrogen;
wherein each of $R^4$ and $R^{11}$ independently is a halogen or a hydrogen;
wherein each of $R^2$ and $R^{13}$ independently is a $C_1$ to $C_{20}$ alkyl, aryl or aralkyl or a hydrogen;
wherein each of $R^{15}$ and $R^{16}$ independently is a 2,7-disubstituted carbazol-9-yl or a 3,6-disubstituted carbazol-9-yl;
wherein L is a $C_3$ or $C_4$ alkylene that forms a 3-carbon bridge or 4-carbon bridge, respectively, between the two oxygen atoms to which L is covalently bonded;
wherein each of $R^1$, $R^3$, $R^{12}$, and $R^{14}$ is a hydrogen;
wherein each of $R^6$ and $R^9$ is a hydrogen or $C_1$-$C_8$ alkyl; optionally, $R^6$ can be linked with $R^7$ and $R^8$ can be linked to $R^9$ to form a cyclic structure;
wherein each X independently is a halogen, a hydrogen, a ($C_1$-$C_{20}$)alkyl, a ($C_7$-$C_{20}$)aralkyl, a ($C_1$-$C_6$)alkyl-substituted ($C_6$-$C_{12}$)aryl, or a ($C_1$-$C_6$)alkyl-substituted benzyl, —$CH_2Si(R^C)_3$, where $R^C$ is $C_1$-$C_{12}$ hydrocarbon; and
wherein M is Zr or Hf, as made as follows.

Biphenylphenol polymerization precatalyst of structure (i) was prepared as follows. To a suspension of $ZrCl_4$ (102 mg, 0.44 mmol) in toluene (20 mL) at −28 C, was added a 3.22 M solution of methyl magnesium bromide (0.57 mL, 1.83 mmol). The solution was stirred for 2 min during which a deep red color formed. The ligand of formula A (3-(2,7-di-tert-butyl-9H-carbazol-9-yl)-2'-(3-((3'-(2,7-di-tert-butyl-9H-carbazol-9-yl)-3,5-difluoro-2'-hydroxy-5'-(2,4,4-trimethylpentan-2-yl)-[1,1'-biphenyl]-2-yl)oxy)propoxy)-5'-fluoro-3'-methyl-5-(2,4,4-trimethylpentan-2-yl)-[1,1'-biphenyl]-2-ol) (550 mg, 0.44 mmol) was then added in one portion as a solution in toluene (10 mL). The ligand of Formula A was prepared as described in 20160108156A1, and the entire contents of 20160108156A1, are incorporated herein by reference. The solution was allowed to warm to room temperature and stirred for a total of 4 hr. Hexane (30 mL) was added and the solution was filtered to remove the insoluble salts. The filtrate was dried under reduced pressure. The crude solid was then taken up in hot toluene (20 mL) and filtered. The filtrate was evaporated under reduced pressure affording 562 mg (93%) of a pale yellow solid. The presence of the biphenylphenol polymerization precatalyst of structure (i) was confirmed by $^1H$ NMR analysis. $^1H$ NMR (400 MHz, $C_6D_6$, 298 K) δ 8.19 (d, J=8.0 Hz, 1H), 8.15 (d, J=8.0 Hz, 2H), 7.73 (s, 1H), 7.66 (s, 1H), 7.60 (d, J=8.0 Hz, 2H), 7.49-7.39 (m, 4H), 7.30 (d, J=8.0 Hz, 1H), 7.20 (s, 1H), d (J=8.0 Hz, 1H), 7.06-7.00 (m, 3H), 6.63 (d, J=8.0 Hz, 1H), 6.22 (dd, J=8.0 Hz and 4.0 Hz, 1H), 5.75 (td, J=8.0 Hz and 4.0 Hz, 1H), 3.62 (t, J=8.0 Hz, 1H), 3.30 (m, 2H), 3.16 (m, 1H), 1.61 (s, 12H), 1.47 (s, 12H), 1.26 (s, 18H), 1.25 (s, 18H), 0.93 (s, 12H), 0.84 (s, 12H), 0.52 (d, 12.0 Hz, 3H), −0.56 (s, 3H), −0.98 (s, 3H).

(Formula A)

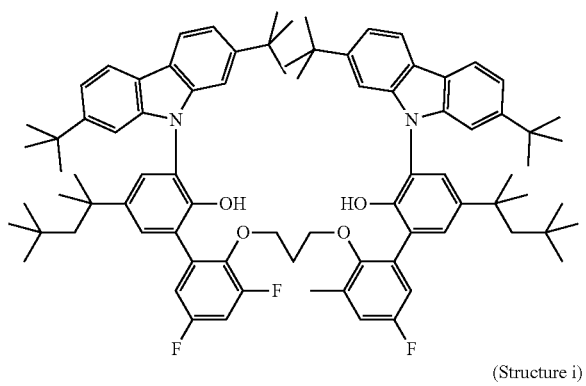

(Structure i)

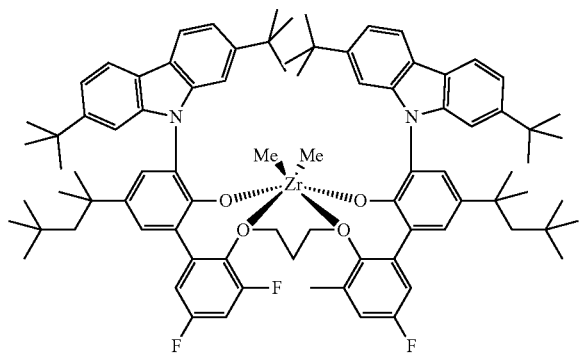

Biphenylphenol polymerization precatalyst of structure (ii) was prepared as follows. To a suspension of ZrCl$_4$ (63 mg, 0.27 mmol) in toluene (20 mL) at −28 C, was added a 3.22 M solution of methyl magnesium bromide (0.37 mL, 1.18 mmol). The solution was stirred for 2 min during which a deep red color formed. The ligand B [2',2'''-(propane-1,3-diylbis(oxy))bis(3-(2,7-bis(diisopropyl(octyl)silyl)-9H-carbazol-9-yl)-5'-fluoro-3'-methyl-5-(2,4,4-trimethylpenta-2-yl)-[1,1'-biphenyl]-2-ol))] (520 mg, 0.27 mmol) was then added in one portion as a solution in toluene (10 mL). The ligand of Formula B was prepared as described in 2018026504(A1), and the entire contents of 2018026504 (A1), are incorporated herein by reference. The solution was allowed to warm to room temperature and stirred for a total of 3 hr. Hexane (30 mL) was added and the solution was filtered to remove the insoluble salts. The filtrate was dried under reduced pressure. The crude solid was then taken up in hot toluene (20 mL) and filtered. The filtrate was evaporated under reduced pressure affording 457 mg (83%) of a pale yellow solid. The presence of the biphenylphenol polymerization precatalyst of structure (ii) was confirmed by $^1$H NMR analysis. $^1$H NMR (400 MHz, C$_6$D$_6$, 298 K) δ 8.26 (d, J=8.0 Hz, 2H), 8.13 (d, J=8.0 Hz, 2H), 8.05 (s, 2H), 7.97 (s, 2H), 7.68 (s, 2H), 7.64 (d, J=8.0 Hz, 2H), 7.54 (d, J=8.0 Hz, 2H), 7.36 (s, 2H), 7.02 (d, J=4.0 Hz, 2H), 6.21 (dd, J=8.0 and 4.0 Hz, 2H), 3.72 (m, 2H), 3.52 (m, 2H), 1.65-0.91 (m, 152H), 0.80 (s, 12H), −0.46 (s, 6H).

(Formula B)

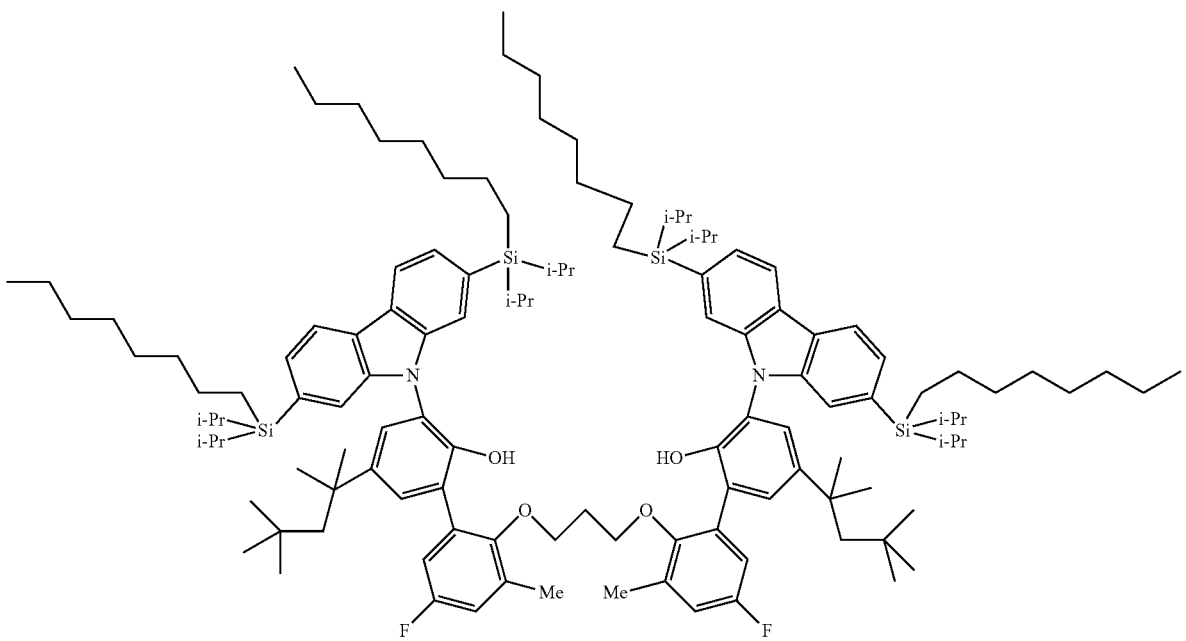

(Structure ii)

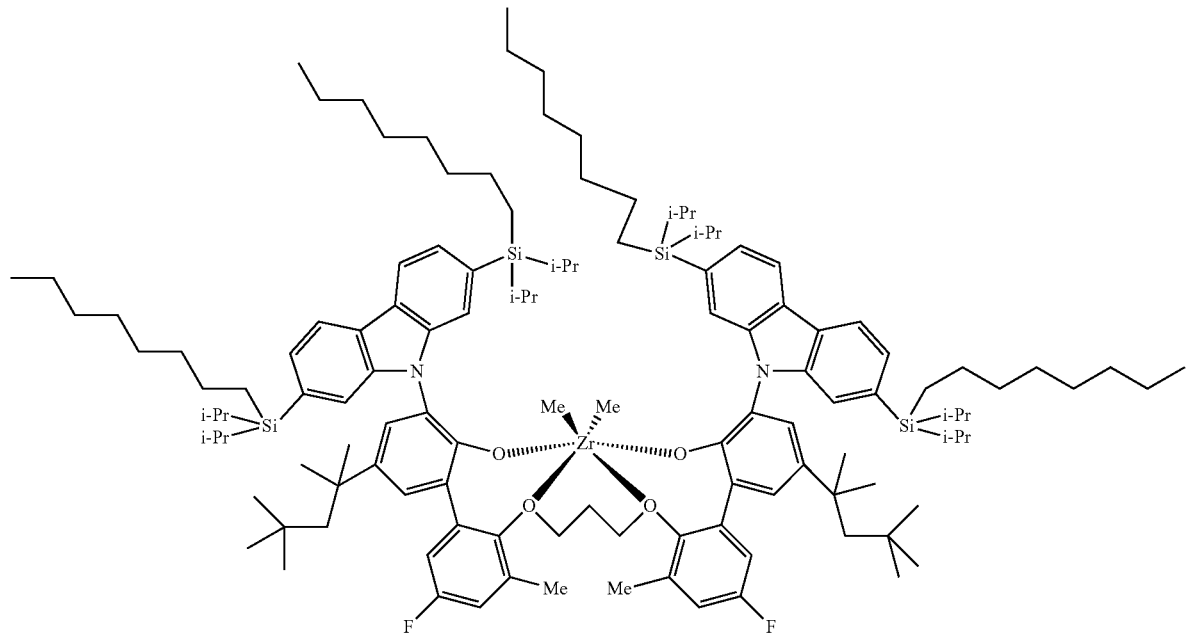

Biphenylphenol polymerization precatalyst of structure (iii) was prepared as follows. To a suspension of ZrCl4 (69 mg, 0.30 mmol) in toluene (20 mL) at −28 C, was added a 3.22 M solution of methyl magnesium bromide (0.40 mL, 1.30 mmol). The solution was stirred for 2 min during which time a deep red color formed. The ligand C (2',2'''-(propane-1,3-diylbis(oxy))bis(3-(2,7-bis(diisopropyl(octyl)silyl)-9H-carbazol-9-yl)-5'-fluoro-3',5-dimethyl-[1,1'-biphenyl]-2-ol)) (513 mg, 0.30 mmol) was then added in one portion as a solution in toluene (10 mL). The ligand of Formula C was prepared as described in WO2017058981A1, and the entire contents of WO2017058981A1 are incorporated herein by reference. The solution was allowed to warm to room temperature and stirred for a total of 3 hr. Hexanes (30 mL) was added and the solution was filtered to remove the insoluble salts. The filtrate was dried under reduced pressure affording 495 mg (90%) of a pale yellow solid. The presence of the biphenylphenol polymerization precatalyst of structure (iii) was confirmed by $^1$H NMR analysis. $^1$H NMR (400 MHz, CD$_6$, 298 K) δ 8.27 (d, J=8.0 Hz, 2H), 8.16 (d, J=8.0 Hz, 2H), 8.05 (s, 2H), 7.96 (s, 2H), 7.63 (d, J=8.0 Hz, 2H), 7.56 (d, J=8.0 Hz, 2H), 6.92 (d, J=4.0 Hz, 2H), 6.79 (d, J=4.0 Hz, 2H), 6.77 (d, J=4.0 Hz, 2H), 6.13 (d, J=4.0 Hz, 1H), 6.11 (d, J=4.0 Hz, 1H), 3.54 (q, J=4.0 Hz, 2H), 3.30 (q, J=4.0 Hz, 2H), 2.13 (s, 6H), 1.66-0.89 (m, 130H), −0.42 (s, 6H).

(Formula C)

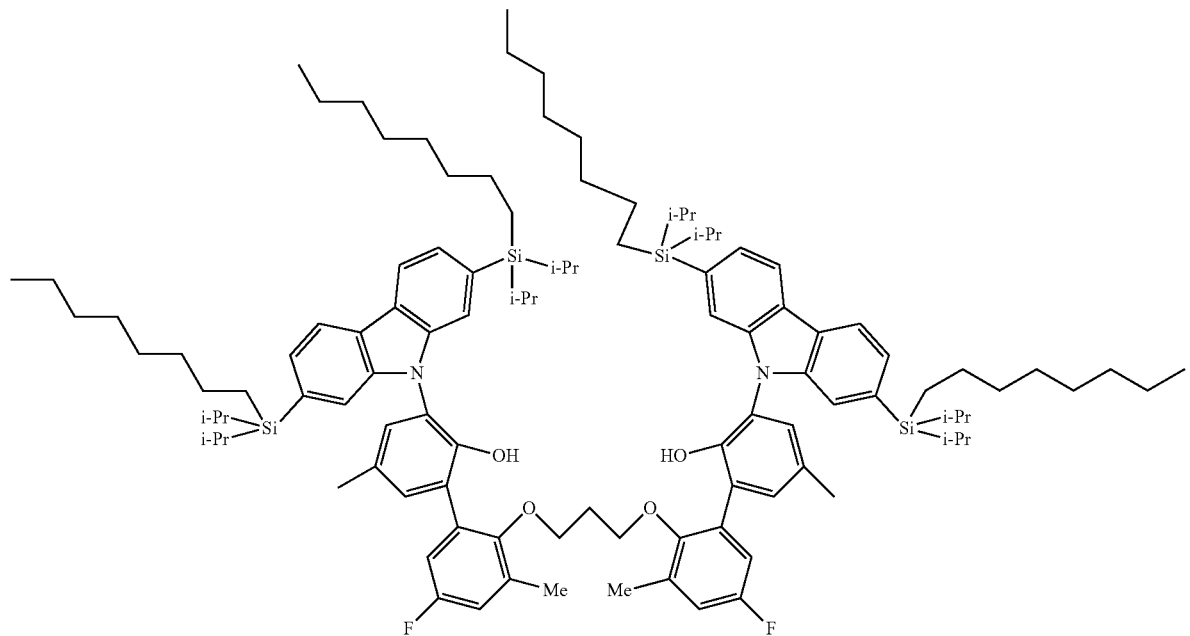

-continued (Structure iii)

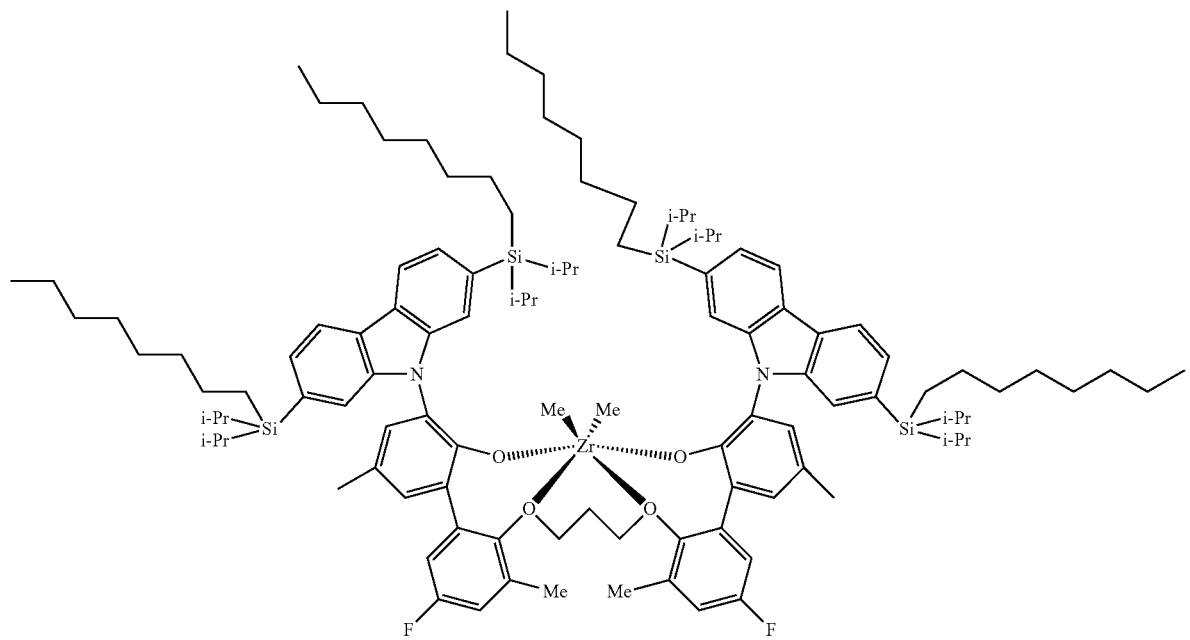

Biphenylphenol polymerization precatalyst of structure (iv) was prepared as described in U.S. Pat. No. 9,000,108B2, and the entire contents of U.S. Pat. No. 9,000,108B2 are incorporated herein by reference.

(Structure iv)

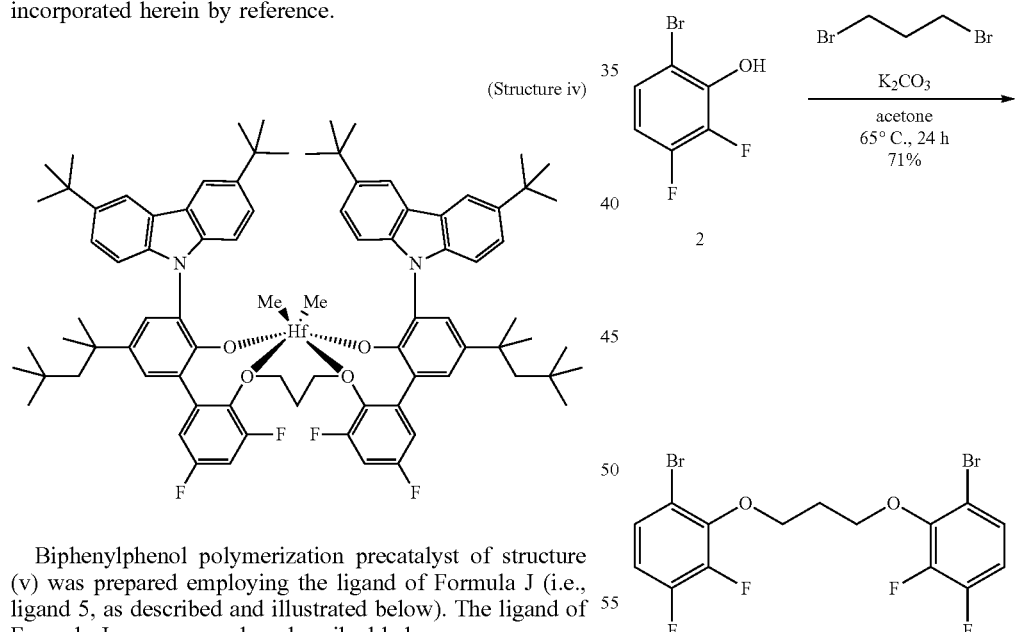

Biphenylphenol polymerization precatalyst of structure (v) was prepared employing the ligand of Formula J (i.e., ligand 5, as described and illustrated below). The ligand of Formula J was prepared as described below.

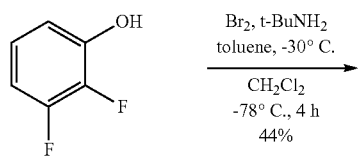

Step 1: Synthesis of (2) A solution of t-Butyl amine (21.9 g, 0.30 mol) in toluene (200 mL) was prepared in a 1 L two neck round bottom flask. Bromine (24.6 g, 0.15 mol) was added slowly to the mixture at −30° C., and the resulting solution was stirred for 15 minutes at this temperature. 2,3-Difluorophenol (1) (20 g, 0.15 mol) in methylene chloride (CH$_2$Cl$_2$) (200 mL) was added to the mixture at −78° C.

The resultant mixture was stirred at −78° C. for 4 h. The reaction mixture was quenched at the same temperature using a sodium thiosulphate solution (40 mL). The mixture was diluted with CH$_2$Cl$_2$ (100 mL) and then washed with water (50 mL), aqueous 1N hydrochloric acid (HCl) (50 mL) and saturated aqueous sodium chloride (brine) (75 mL). The organic layer was isolated using a separatory funnel, then the volatiles were removed under reduced pressure. Purification of the crude material by silica gel column chromatography provided 14 g of intermediate 2 with 95% purity by GCMS (Yield=44%). $^1$H-NMR (400 MHz, CDCl$_3$): δ [ppm] 5.76 (br s, 1H), 6.69-6.75 (m, 1H), 7.21-7.25 (m, 1H). $^{19}$F-NMR (376.5 MHz, CDCl$_3$): δ [ppm]-156.4 (d, J=22.6 Hz, 1F), −136.2 (d, J=18.8 Hz, 1F). LCMS: 209 (M+1) & 211 (M+3).

Step 2: Synthesis of (3) Intermediate (2) (11 g, 0.053 mol) and 1,3-dibromopropane (5.3 g, 0.026 mol) were dissolved in acetone (200 mL) in a 500 mL two-neck round bottom flask. Potassium carbonate (K$_2$CO$_3$) (22 g, 0.16 mol) was added to the suspension, which was then stirred at 65° C. for 24 h. The mixture was cooled then filtered. The filtrate was concentrated under vacuum to provide the crude residue, which was dissolved in CH$_2$Cl$_2$ (200 mL), transferred to a separatory funnel, then washed with aq. 3N KOH (50 mL) followed by saturated aq. K$_2$CO$_3$ (50 mL×2). The organic layer was dried over magnesium sulfate (MgSO$_4$) then concentrated to dryness to yield the crude product. Purification of the crude product by silica gel column chromatography (two times) gave 8.5 g of 3 in 97% purity by GCMS. (Yield=71%). $^1$H-NMR (400 MHz, CDCl$_3$): δ [ppm] 2.34 (quin, J=6.0 Hz, 2H), 4.46 (t, J=6.0 Hz, 4H), 6.81-6.88 (m, 2H), 7.27-7.29 (m, 2H). $^{19}$F-NMR (376.5 MHz, CDCl$_3$): δ [ppm]-150.2 (d, J=18.8 Hz, 1F), −136.1 (d, J=18.8 Hz, 1F). $^{13}$C-NMR (100 MHz, CDCl$_3$): δ [ppm] 30.8, 70.9, 71.0, 111.7, 112.3, 112.4, 126.7, 126.8, 126.8, 126.8, 143.7, 143.8, 145.7, 145.8, 146.2, 146.3, 149.6, 149.7, 152.1, 152.2. GCMS: 458 (M).

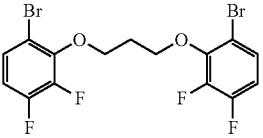

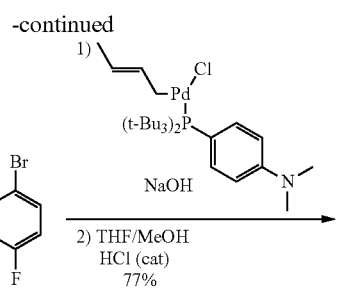

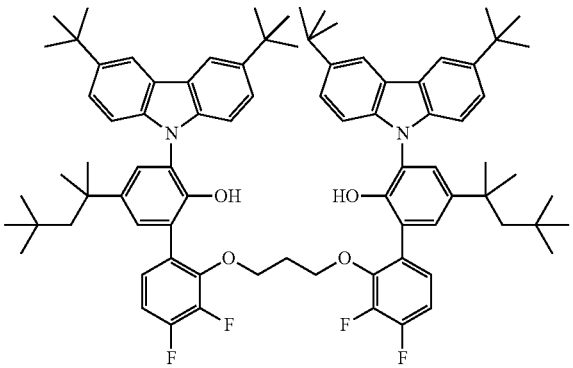

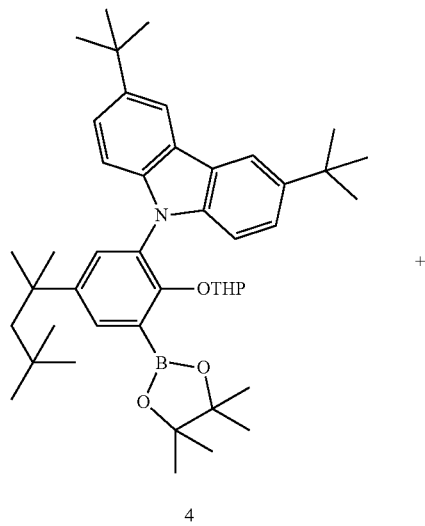

Step 3: Synthesis of ligand (5) Degassed THF (10 mL) and degassed water (3 mL) were added to a 40 mL vial charged with boronic ester 4 (Preparation of 4 is provided in U.S. Pat. No. 8,609,794B2) (0.87 g, 1.25 mmol), dibromide 3 (0.26 g, 0.57 mmol), solid NaOH (0.11 g, 2.84 mmol), and Pd-Amphos (0.01 g, 0.02 mmol). The reaction was warmed to 55° C. and maintained at this temperature for 18 h. After this time, the reaction was cooled to room temperature. The mixture was transferred to a separatory funnel, diethyl ether (Et$_2$O) (25 mL) and water (10 mL) were added, and the layers were separated. The organics were washed with brine (10 mL), dried (Na$_2$SO$_4$), and filtered. To the above filtrate, MeOH (10 mL) was added along with concentrated HCl (8 drops from a glass pipet). The solution was stirred at room temperature for 18 h. The solution was concentrated to dryness under reduced pressure. The residue was dry loaded with CELITE onto a precartridge then purified directly using reverse phase flash chromatography (50 g C18, 40 mL/min, 0% THF to 50% THF in CH$_3$CN over 15 min) to provide 0.55 g (77%) of 5 as a white solid: $^1$H NMR (400 MHz, CDCl$_3$) δ 8.13 (dd, J=2.0, 0.6 Hz, 4H), 7.42-7.34 (m, 6H), 7.30 (d, J=2.4 Hz, 2H), 7.09 (ddd, J=8.1, 5.8, 1.9 Hz, 2H), 7.06-6.92 (m, 6H), 5.37 (s, 2H), 4.02 (t, J=6.0 Hz, 4H), 1.86 (p, J=6.0 Hz, 2H), 1.69 (s, 4H), 1.43 (s, 36H), 1.33 (s, 12H), 0.77 (s, 18H); $^{19}$F NMR (376 MHz, CDCl$_3$) δ −136.39 (d, J=20.3 Hz), −153.30 (d, J=20.1 Hz). LCMS (ES/APCIMS m/z 1264 [(M+H)+].

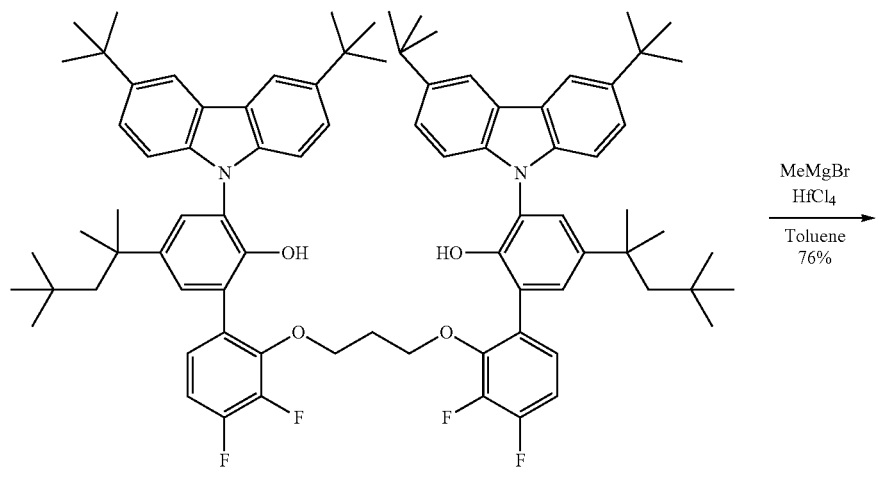

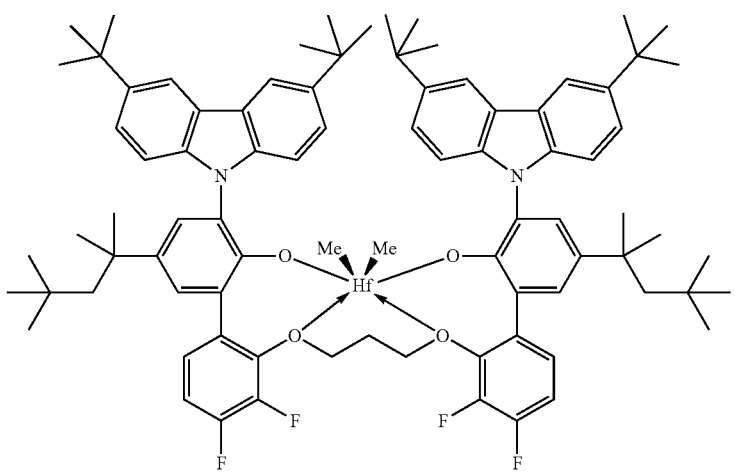

Step 4: Synthesis precatalyst of structure (v). Biphenylphenol polymerization precatalyst of structure (v) was prepared as follows: 3M MeMgBr in Et$_2$O (0.25 mL) was added to a −30° C. solution of HfCl$_4$ (0.06 g, 0.18 mmol) in toluene (6 mL). After stirring for 5 minutes the ligand 5 (i.e., Ligand J, below) (2',2'''-(propane-1,3-diylbis(oxy))bis(3-(3,6-di-tert-butyl-9H-carbazol-9-yl)-3',4'-difluoro-5-(2,4,4-trimethylpentan-2-yl)-[1,1'-biphenyl]-2-ol))(0.23 g, 0.18 mmol) in toluene (1 mL) was added. The mixture was stirred for 18 h then the solvent was removed under reduced pressure. A mixture of hexanes and toluene (5:1, 12 mL) was added to the residue, the solution was shaken for a few minutes at room temperature, then this material was passed through a fritted funnel packed with a CELITE plug. The frit was extracted with a hexanes and toluene mixture (5:1, 12 mL). The combined extracts were concentrated to dryness under reduced pressure, which provided 0.2 g (76%) of product as a tan solid. The presence of the biphenylphenol polymerization precatalyst of structure (v) was confirmed by NMR. $^1$H NMR (400 MHz, C$_6$D$_6$) δ 8.63-8.57 (m, 2H), 8.35-8.30 (m, 2H), 7.93-7.82 (m, 6H), 7.61-7.54 (m, 2H), 7.35 (dd, J=8.8, 1.9 Hz, 2H), 7.19 (d, J=2.5 Hz, 2H), 6.69-6.58 (m, 2H), 6.39-6.29 (m, 2H), 3.99 (app dt, J=10.7, 5.9 Hz, 2H), 3.17-3.06 (m, 2H), 1.69 (s, 22H), 1.29 (s, 24H), 1.24 (s, 6H), 1.17-1.08 (m, 2H), 0.87 (s, 18H), −0.87 (s, 6H); $^{19}$F NMR (376 MHz, C$_6$D$_6$) δ −135.70 (d, J=20.5 Hz), −148.58 (d, J=20.4 Hz).

(Formula J)

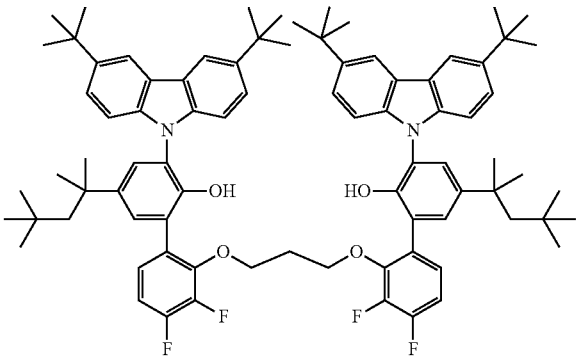

(Structure v)

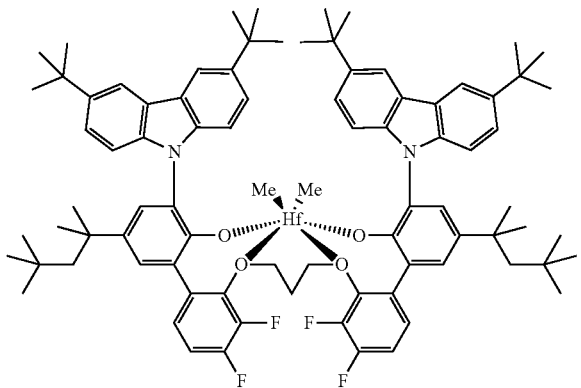

Comparative polymerization precatalyst of Structure (vi) was prepared as described in US20150291713A1, and the entire contents of US20150291713A1 are incorporated herein by reference.

(Structure vi)

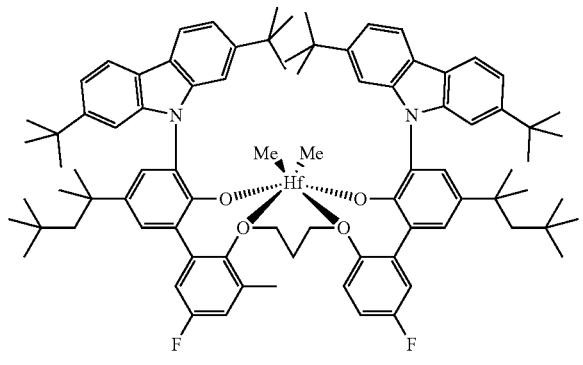

Comparative polymerization precatalyst of structure (vii) was prepared as described in US20160108156A1, and the entire contents of US20160108156A1 are incorporated herein by reference.

(Structure vii)

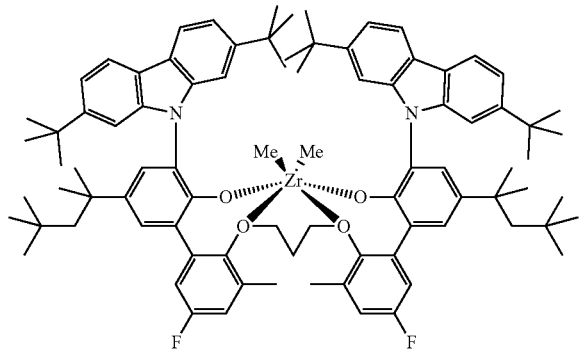

Example 1 (EX1), an activated and supported biphenylphenol polymerization catalyst of Formula I, was prepared as follows. In a nitrogen-purged glove box an oven-dried glass bottle was charged with 2.65 gram (g) of treated fumed silica (CABOSIL TS-610; available from W.R. Grace) slurried in 75 g of toluene (available from Aldrich), and a stir bar and stirred until well dispersed. 22 g of a 10% solution by weight of methylaluminoxane (MAO)(available from W.R. Grace as 10 wt % in toluene) was added to the bottle to make a mixture. The mixture was stirred magnetically for 15 minutes, then the biphenylphenol polymerization precatalyst of structure i (0.303 g) was added and the mixture was stirred for 30-60 minutes. The mixture was spray-dried using a Buchi Mini Spray Dryer B-290 with the following parameters to yield the dried, supported and activated biphenylphenol polymerization catalyst of Example 1: Set Temperature—185° C., Outlet Temperature—100° C. (min.), Aspirator—95 and Pump Speed—150 rpm.

Example 2 (EX2) was prepared the same as Example 1 with the change that the catalyst of Example 2 was utilized, as indicated in Table 1.

Example 3 (EX3), was prepared the same as Example 1 with the change that the catalyst of Example 3 was utilized, as indicated in Table 1.

Example 4 (EX4), was prepared the same as Example 1 with the change that the catalyst of Example 4 was utilized, as indicated in Table 1.

Example 5 (EX5), was prepared the same as Example 1 with the change that the catalyst of Example 5 was utilized, as indicated in Table 1.

Example 6 (EX6), was prepared the same as Example 1 with the change that Example 6 was conducted at the conditions as indicated in Table 1 for Example 6.

Example 7 (EX7), was prepared the same as Example 2 with the change that Example 7 was conducted at the conditions as indicated in Table 1 for Example 7.

Example 8 (EX8), was prepared the same as Example 3 with the change that Example 8 was conducted at the conditions as indicated in Table 1 for Example 8.

Example 9 (EX9), was prepared the same as Example 4 with the change that Example 9 was conducted at the conditions as indicated in Table 1 for Example 9.

Comparative Example 1 (CE1), was prepared the same as Example 1 with the change that the catalyst of Comparative Example 1 was utilized, as indicated in Table 1.

Comparative Example 2 (CE2), was prepared the same as Example 1 with the change that the catalyst of Comparative Example 2 was utilized, as indicated in Table 1.

Ethylene/1-hexene copolymerizations of EX1-9 and CE1-2 were conducted in the gas-phase in a 2 L semi-batch autoclave polymerization reactor equipped with a mechanical agitator as follows. The reactor was first dried for 1 hour, charged with 200 g of sodium chloride (NaCl) and dried by heating at 100° C. under nitrogen for 30 minutes. After drying, 5 gram of silica supported methylaluminoxane (SMAO) was introduced as a scavenger under nitrogen pressure. After adding the SMAO, the reactor was sealed and components were stirred. The reactor was then charged with hydrogen ($H_2$ preload, as indicated below for each condition) and hexene ($C_6/C_2$ ratio, as indicated below for each condition), then pressurized with ethylene (230 psi). Once the system reached a steady state, the type and amount of respective activated catalyst as identified by Table 1 and 2 for each of EX1-9 and CE1-2 was charged into the reactor at 80° C. to start polymerization. The reactor temperature was brought to 90 or 100° C. and maintained at this temperature throughout the 1 hour run. The runs were conducted at Condition B or K as detailed below in Table 1. At the end of the run, the reactor was cooled down, vented and opened. The resulting product mixture was washed with water and methanol, then dried. The results for EX1-9 and CE1-2 are shown in Table 1.

The slurry-phase biphenylphenol polymerization precatalyst of structure (viii) was prepared as described in WO2017004456, and the entire contents of WO2017058981A1 are incorporated herein by reference.

(Structure viii)

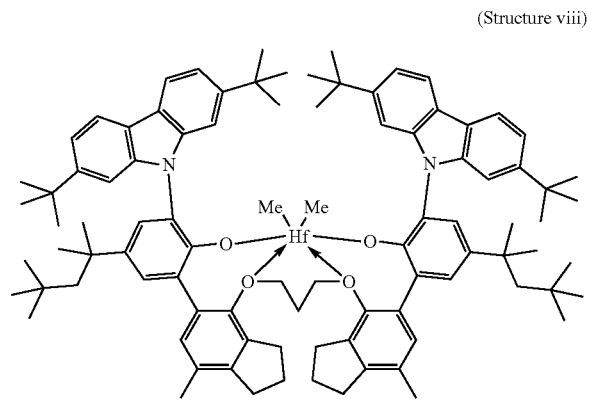

Example 10 (EX10), was prepared in an inert atmosphere glove box under nitrogen. Isopar E, ethylene, and hydrogen was purified by passage through 2 columns, the first containing A2 alumina and the second containing Q5 reactant. 48 parallel pressure reactor (PPR)-A reactor cells were prepared the weekday prior to the actual PPR run as follows: A tared library of glass tubes were manually inserted into the reactor wells, the stirrer paddles attached to the module heads, and the module heads attached to the module bodies. The reactors were heated to 150° C., purged with nitrogen for 10 hours, and cooled to 50° C. On the day of the experiment, the reactors were purged twice with ethylene and vented completely to purge the lines. The reactors were then heated to 50° C. and the stirrers turned on at 400 rpm. The reactors were filled to the appropriate solvent level with Isopar-E using the robotic needle to give a final reaction volume of 5 mL. The solvent injections to modules 1-3 were performed using the left robotic arm and the solvent injections to modules 4-6 used the right robotic arm with both arms operating simultaneously. Following solvent injection, the reactors were heated to final desired temperature and stirring increased to the set points programmed in the Library Studio design. When the reactors reached the temperature set point, which required about 10-30 minutes depending on the desired temperature, the cells were pressurized to the desired set point with either pure ethylene or a mixture of ethylene and hydrogen from the gas accumulator and the solvent saturated (as observed by the gas uptake). If an ethylene-hydrogen mixture was used, once the solvent was saturated in all cells, the gas feed line was switched from the ethylene-hydrogen mixture to pure ethylene for the remainder of the run. The robotic synthesis protocol was then initiated whereby the comonomer solution (1-hexene) was injected first, followed by the scavenger solution (SMAO), and finally the catalyst solutions in Isopar-E. All of the injections to modules 1-3 were performed using the left robotic arm and the injections to modules 4-6 used the right robotic arm with both arms operating simultaneously. All three injections for a given cell completed before the robot started the injection of the next cell in the sequence. Each reagent addition was chased with 500 μl of Isopar-E solvent to ensure the complete injection of the reagent. After each reagent addition, the needles were washed with Isopar-E inside and outside the needle. At the moment of the catalyst injection in each individual cell, the reaction timer was started. The polymerization reactions proceeded for 60-180 minutes or to the set ethylene uptake of 60-180 psi, whichever occurred first, and then were quenched by adding a 40 psi overpressure of 10% (v/v) CO2 in argon. Data collection continued for 5 minutes after the quench of each cell. The reactors were cooled down to 50° C., vented, and the PPR tubes removed from the module blocks. The PPR library was removed from the drybox and the volatiles then removed using the Genevac rotary evaporator to obtain the polymer of Example 10.

Example 11 (EX11), was prepared the same as Example 10 with the change that Example 11 was conducted at the conditions as indicated in Table 2 for Example 11. The results for EX10 and EX11 are shown in Table 2.

Procedure for catalyst preparation—supporting reaction of Structure viii onto SMAO: All work is performed in a nitrogen purge box on Core Module 3 (CM3) high throughput unit. Prior to starting the experiment, a solution of Structure viii were prepared to the desired concentration in toluene. To each reaction vial, the desired amount of SMAO was manually weighed to reach 45 μmol catalyst per 1 g SMAO (about 1:108 equivalent ratio) and added along with the tumble stir disc. Toluene was dispensed by the CM3, followed by the desired amount of the Structure viii stock solution. After adding all the reaction components, the vials were capped, stirred to 300 rpm and heated to 50° C. After 30 minutes, the vials were cooled to room temperature, caps removed and the reaction plate placed in a CM3 vortexing deck position. Reaction vials were allowed to mix with vortexing at 800 rpm for 3 minutes, allowing homogeneous slurry to form. The desired amount of each supported catalyst slurry was then daughtered in into 8 mL vials and diluted with Isopar E. When multiple daughter samples were required, a new PDT tip was utilized for each subsequent daughtering step. Reactions were daughtered to the desired concentration for the PPR.

In various embodiments, the biphenylphenol polymerization precatalyst is selected from a group consisting of one or more the structures (i), (ii), (iii), (viii), (iv), and/or (v), as detailed herein. In various embodiments, the biphenylphenol polymerization precatalyst is selected from a group consisting of one or more the structures (i), (ii), (iii), (iv), and/or (v), as detailed herein. In various embodiments, the biphenylphenol polymerization precatalyst is selected from a group consisting of one or more the structures (i), (ii), (iii), (viii), (iv), and (v), as detailed herein. In various embodiments, the biphenylphenol polymerization precatalyst is selected from a group consisting of one or more the structures (i), (ii), (iii), (iv), and (v), as detailed herein.

B-conditions as follows: Temperature=100° C.; Ethylene=220 pounds per square inch (psi); $H_2/C_2$=0.0017; $C_6/C_2$=0.004. $B_{slurry}$ conditions as follows: Temperature=100 C; Ethylene=100 pounds per square inch (psi); $H_2/C_2$=0.012.

K-conditions are as follows: Temperature=100° C.; Ethylene=220 psi; $H_2/C_2$=0.0068; $C_6/C_2$=0.004. $B_{slurry}$ conditions as follows: Temperature=100 C; Ethylene=100 pounds per square inch (psi); $H_2/C_2$=0.05.

Bimodal GPC plot (Y/N): the presence or absence of resolved polymodality such as bimodality by plotting dWf/d Log M (mass detector response) on y-axis versus Log M on the x-axis to obtain a GPC chromatogram curve containing local maxima log(MW) values for LMW and HMW polyethylene component peaks, and observing the presence or absence of a local minimum between the LMW and HMW polyethylene component peaks. The dWf is change in weight fraction, d Log M is also referred to as d Log(MW) and is change in logarithm of molecular weight, and Log M is also referred to as Log(MW) and is logarithm of molecular weight.

Mn (number average molecular weight) and Mw (weight average molecular weight, were determined by gel permeation chromatography (GPC), as is known in the art. Values are reported in units of daltons (Da).

Polydispersity index (PDI) refers to a measure of the distribution of molecular mass in a given polymer sample. The polydispersity index is calculated by dividing the Mw by the Mn.

Melt temperature (i.e., Tm) can be determined via Differential Scanning Calorimetry according to ASTM D 3418-08. For instance, using a scan rate of 10° C./min on a sample of 10 mg and using the second heating cycle.

instance, EX1-9 (gas-phase; conducted at B-conditions/K-conditions, as detailed in Table 1) each provided polyethylenes having a high molecular weight polyethylene component (as represented by a second peak in a molecular weight distribution of the polyethylene) and a low molecular weight polyethylene component (as represented by a first peak in a molecular weight distribution plot of the polyethylenes). Additionally, EX1-11 each provide a PDI of greater than 5.0 (at both B-conditions and K-conditions), as compared to the PDI of CE 1 and CE 2 which were less than 3.0 and/or had a GPC plot that was not bimodal, as indicated in Table 1.

In summary, each of EX1-9 demonstrates the presence of bimodality across a wide range of conditions such as at a $H_2/C_2$ value in a range of from 0.0017-0.0068 as evidenced by having a PDI of greater than 5.0 and a GPC plot the demonstrates the presence of bimodality. Additionally, each of EX10-11 provide a PDI of greater than 5.0. Furthermore, the bimodal polymers provided by the supported biphenylphenol polymerization catalysts of EX1-11 are formed in

TABLE 1

GAS-PHASE EXAMPLES

| Ex. (pre-cat.) | M | | Cat. Charge (mg or umol) | Cat. Prod. (gPE/gcat/hr) | Mw (Da) | Mn (Da) | PDI | Tm (° C.) | Bi-modal GPC plot (Y/N) |
|---|---|---|---|---|---|---|---|---|---|
| EX 1 (i) | Zr | B | 15.4 mg | 26,532 | 205,275 | 32,365 | 6.34 | 124.3 | Y |
| EX 2 (ii) | Zr | B | 15.2 mg | 4381 | 1,413,000 | 79,135 | 17.9 | 128.1 | Y |
| EX 3 (iii) | Zr | B | 10.3 mg | 6155 | 950,298 | 64,498 | 14.7 | 128.6 | Y |
| EX 4 (iv) | Hf | B | 5.2 mg | 15846 | 145,159 | 12,702 | 11.43 | 120.2 | Y |
| EX 5 (v) | Hf | B | 25.4 mg | 724 | 209,913 | 5,773 | 36.36 | 119.4 | Y |
| EX 6 (i) | Zr | K | 4.7 mg | 35701 | 162,411 | 80,754 | 5.56 | 126.9 | Y |
| EX 7 (ii) | Zr | K | 15.3 mg | 4405 | 1,068,221 | 45,441 | 23.5 | 129.3 | Y |
| EX 8 (iii) | Zr | K | 9.6 mg | 4062 | 1,564,158 | 43,465 | 35.9 | 130.1 | Y |
| EX 9 (iv) | Hf | K | 5.1 mg | 12783 | 154,743 | 12,501 | 12.38 | 119.5 | Y |
| CE 1 (vi) | Hf | B | 10.6 mg | 4443 | UHMW** | None | None | 128.3 | N |
| CE2 (vii) | Zr | B | 1 mg | 183282 | 227,628 | 79,681 | 2.86 | 122.7 | N |

**UHMW refers to an ultra-high molecular weight outside the detection limit.

TABLE 2

SLURRY-PHASE EXAMPLES

| Ex. (pre-cat.) | M | Condition | Catalyst Charge (mg or umol) | Mw (Da) | Mn (Da) | PDI |
|---|---|---|---|---|---|---|
| EX 10 (viii) | Hf | B | 0.0155 umol | 422,500 | 16,800 | 25.2 |
| EX 11 (viii) | Hf | K | 0.031 umol | 316,600 | 16,800 | 18.8 |
| CE3 (vi) | Hf | B | 0.031 umol | 207,000 | 46,700 | 4.4 |

As detailed in Table 1, EX1-9 each provide for supported biphenylphenol polymerization catalysts making polyethylenes having bimodal distributions as evidenced by having a PDI of greater than 5 and a GPC plot that demonstrates the presence of bimodality across a wide range of conditions such as a $H_2/C_2$ value in a range of from 0.0017-0.0068. For a single reactor gas-phase or slurry-phase polymerization reactor without help from any other polymerization catalyst, in contrast to other approaches that rely on multiple reactors and/or multiple polymerization catalysts to provide bimodal polymers, and in contrast to other polymerization catalysts (such as CE1 and CE2) that provide polymers having a unimodal distribution.

What is claimed is:

1. A method of making a bimodal polyethylene composition, the method comprising: polymerizing ethylene in a single gas-phase polymerization reactor under gas-phase polymerization conditions in presence of a supported biphenylphenol polymerization catalyst to make the bimodal polyethylene composition without help from any other polymerization catalyst; wherein the bimodal polyethylene composition comprises a high molecular weight polyethylene component and a low molecular weight polyethylene component, further wherein the supported biphenylphenol polymerization catalyst is made according to the following method:

disposing a biphenylphenol polymerization precatalyst of Formula I on a support to give a supported biphenylphenol polymerization precatalyst; and contacting, under activating conditions, the supported biphenylphenol polymerization precatalyst with an activator so as to activate the supported biphenylphenol polymerization precatalyst, thereby making the supported biphenylphenol polymerization catalyst,

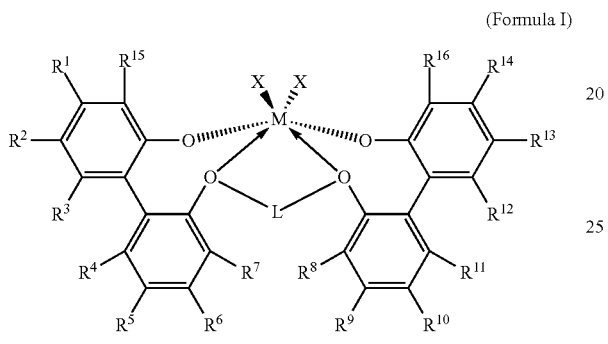

(Formula I)

wherein each of $R^7$ and $R^8$ independently is a $C_1$ alkyl, halogen, or a hydrogen;

wherein each of $R^5$ and $R^{10}$ independently is a $C_1$ to $C_{20}$ alkyl, aryl aralkyl, halogen, or a hydrogen;

wherein each of $R^4$ and $R^{11}$ independently is a halogen or a hydrogen;

wherein each of $R^2$ and $R^{13}$ independently is a $C_1$ to $C_{20}$ alkyl, aryl of aralkyl or a hydrogen;

wherein each of $R^{15}$ and $R^{16}$ independently is a 2,7-disubstituted carbazol-9-yl or a 3,6-disubstituted carbazol-9-yl;

wherein L is a $C_3$ or $C_4$ alkylene that forms a 3-carbon bridge or 4-carbon bridge, respectively, between the two oxygen atoms to which L is covalent bonded;

wherein each of $R^1$, $R^3$, $R^{12}$, and $R^{14}$ is a hydrogen;

wherein each of $R^6$ and $R^9$ is a hydrogen or $C_1$-$C_8$ alkyl; optionally, $R^6$ can be linked with $R^7$ and $R^8$ can be linked to $R^9$ to form a cyclic structure;

wherein each X independently is a halogen, a hydrogen, a $(C_1$-$C_{20})$alkyl, a $(C_7$-$C_{20})$aralkyl, a $(C_1$-$C_6)$alkyl-substituted $(C_6$-$C_{12})$aryl, or a $(C_1$-$C_6)$alkyl-substituted benzyl, —$CH_2Si(R^C)_3$, where $R^C$ is $C_1$-$C_{12}$ hydrocarbon; and wherein M is Zr or Hf.

2. The method of claim 1 in which the bimodal polyethylene composition has a polydispersity index (PDI) in a range from 5 to 40 or 7 to 40.

3. A method of making a unimodal polyethylene composition, the method comprising:

polymerizing ethylene in a single slurry-phase polymerization reactor under slurry-phase polymerization conditions in presence of a supported biphenylphenol polymerization catalyst to make the polyethylene composition without help from any other polymerization catalyst, wherein the unimodal polyethylene composition has a polydispersity index (PDI) in a range from 5 to 40 or 7 to 40, further wherein, the supported biphenylphenol polymerization catalyst is made according to the following method:

disposing a biphenylphenol polymerization precatalyst of Formula I on a support to give a supported biphenylphenol polymerization precatalyst; and contacting, under activating conditions, the supported biphenylphenol polymerization precatalyst with an activator so as to activate the supported biphenylphenol polymerization precatalyst, thereby making the supported biphenylphenol polymerization precatalyst,

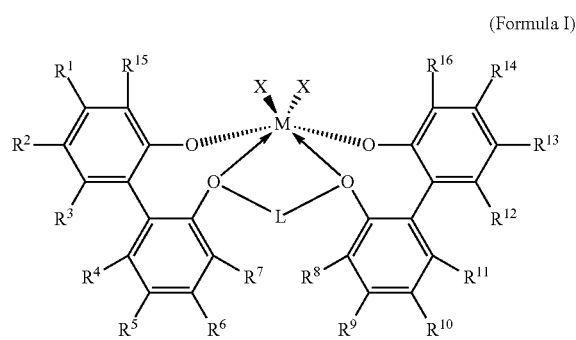

(Formula I)

wherein each of $R^7$ and $R^8$ independently is a $C_1$ alkyl, halogen, or a hydrogen;

wherein each of $R^5$ and $R^{10}$ independently is a $C_1$ to $C_{20}$ alkyl, aryl aralkyl, halogen, or a hydrogen;

wherein each of $R^4$ and $R^{11}$ independently is a halogen or a hydrogen;

wherein each of $R^2$ and $R^{13}$ independently is a $C_1$ to $C_{20}$ alkyl, aryl of aralkyl or a hydrogen;

wherein each of $R^{15}$ and $R^{16}$ independently is a 2,7-disubstituted carbazol-9-yl or a 3,6-disubstituted carbazol-9-yl;

wherein L is a $C_3$ or $C_4$ alkylene that forms a 3-carbon bridge or 4-carbon bridge, respectively, between the two oxygen atoms to which L is covalent bonded;

wherein each of $R^1$, $R^3$, $R^{12}$, and $R^{14}$ is a hydrogen;

wherein each of $R^6$ and $R^9$ is a hydrogen or $C_1$-$C_8$ alkyl; optionally, $R^6$ can be linked with $R^7$ and $R^8$ can be linked to $R^9$ to form a cyclic structure;

wherein each X independently is a halogen, a hydrogen, a $(C_1$-$C_{20})$alkyl, a $(C_7$-$C_{20})$aralkyl, a $(C_1$-$C_6)$alkyl-substituted $(C_6$-$C_{12})$aryl, or a $(C_1$-$C_6)$alkyl-substituted benzyl, —$CH_2Si(R^C)_3$, where $R^C$ is $C_1$-$C_{12}$ hydrocarbon; and wherein M is Zr or Hf.

4. A biphenylphenol polymerization precatalyst selected from the group consisting of structures (i), (ii), (iii), and (v):

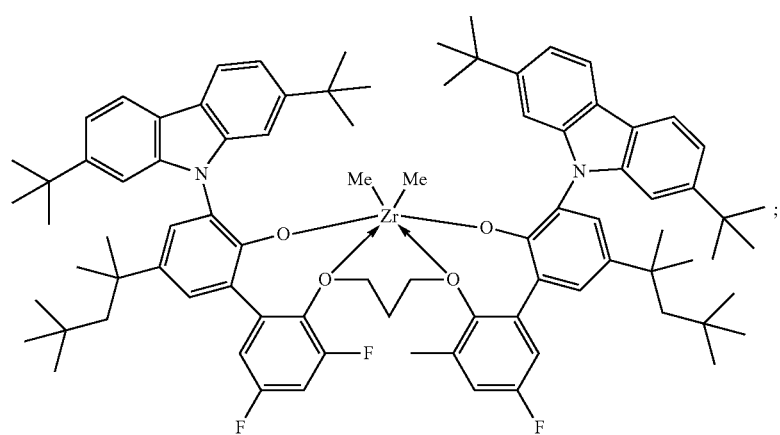
(i)
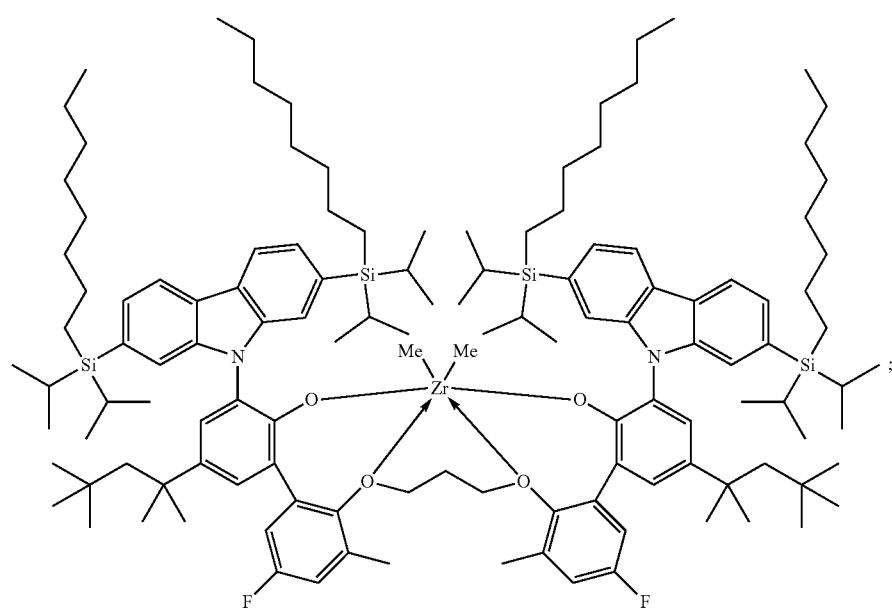
(ii)
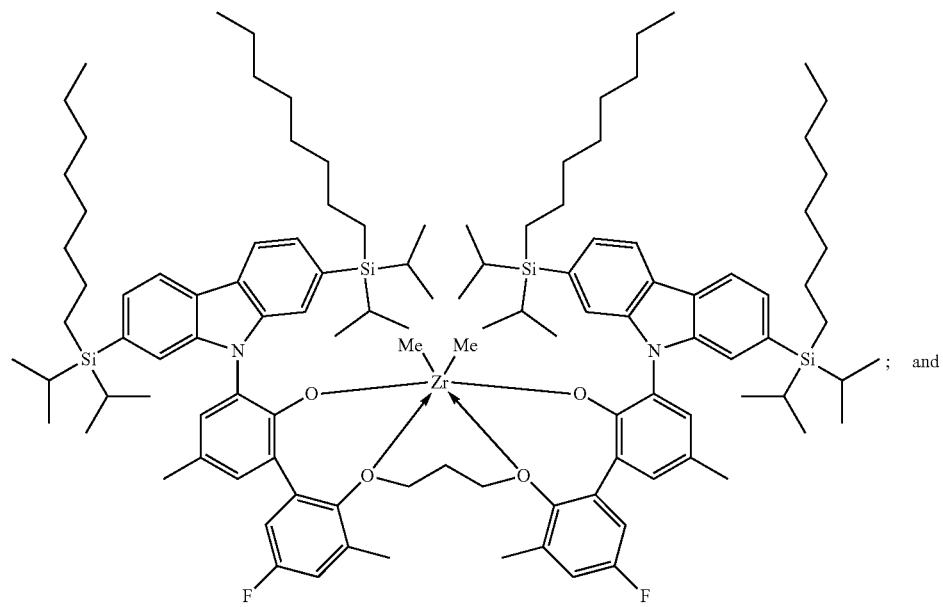
(iii)

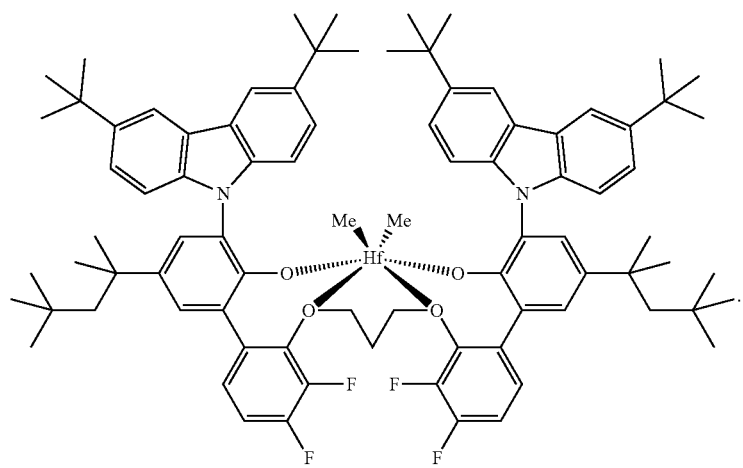
(v)
* * * * *